(12) United States Patent
Gamroth et al.

(10) Patent No.: US 11,671,274 B2
(45) Date of Patent: Jun. 6, 2023

(54) BUILDING WITH WI-FI MESH NETWORK

(71) Applicant: Johnson Controls Technology Company, Auburn Hills, MI (US)

(72) Inventors: Timothy C. Gamroth, Dousman, WI (US); Nicholas J. Schaf, Hartland, WI (US); Robert C. Hall, Jr., Brown Deer, WI (US)

(73) Assignee: Johnson Controls Tyco IP Holdings LLP, Milwaukee, WI (US)

( * ) Notice: Subject to any disclaimer, the term of this patent is extended or adjusted under 35 U.S.C. 154(b) by 507 days.

(21) Appl. No.: 16/246,080

(22) Filed: Jan. 11, 2019

(65) Prior Publication Data

US 2020/0228367 A1   Jul. 16, 2020

(51) Int. Cl.
| | |
|---|---|
| *H04W 88/10* | (2009.01) |
| *H04L 12/28* | (2006.01) |
| *F24F 11/58* | (2018.01) |
| *F24F 11/88* | (2018.01) |
| *H04W 84/18* | (2009.01) |

(52) U.S. Cl.
CPC .......... *H04L 12/2816* (2013.01); *F24F 11/58* (2018.01); *F24F 11/88* (2018.01); *H04W 88/10* (2013.01); *H04L 2012/2841* (2013.01); *H04W 84/18* (2013.01)

(58) Field of Classification Search
CPC .......... H04L 12/2816; H04L 2012/2841; F24F 11/88; F24F 11/58; F24F 2140/00; F24F 11/56; H04W 88/10; H04W 84/18; H04W 84/12
See application file for complete search history.

(56) References Cited

U.S. PATENT DOCUMENTS

| | | | |
|---|---|---|---|
| 9,924,243 B2 | 3/2018 | Lupien et al. | |
| 10,791,020 B2* | 9/2020 | Foster | ..................... H04L 41/12 |
| 2002/0063621 A1* | 5/2002 | Tseng | ................... H01R 12/778 340/2.7 |
| 2005/0018638 A1* | 1/2005 | Lindskog | .......... H04W 52/0277 370/338 |
| 2005/0063121 A1* | 3/2005 | Jordan | .................. H02J 7/1415 361/103 |
| 2007/0085516 A1* | 4/2007 | Fenwick | ................... G06F 1/26 323/234 |
| 2008/0080414 A1* | 4/2008 | Thubert | ................ H04W 76/12 370/328 |
| 2009/0235107 A1* | 9/2009 | Gelonese | .............. G06F 1/3203 713/340 |
| 2009/0265412 A1* | 10/2009 | Hainzer | .................. G06F 1/189 709/200 |

(Continued)

*Primary Examiner* — Atique Ahmed
(74) *Attorney, Agent, or Firm* — Foley & Lardner LLP

(57) ABSTRACT

The present disclosure relates to a building network system for a building. The system includes network devices forming a network for the building. Each of the network devices include a communications processing circuit including an access point configured to communicate with any of the network devices to form the network, and a second processing circuit removably communicably connected to the communications processing circuit. The communications processing circuit and the second processing circuit are configured to operate independently of each other. The access point is a wireless radio configured to wirelessly communicate with the access points of any of the network devices.

20 Claims, 13 Drawing Sheets

(56) References Cited

U.S. PATENT DOCUMENTS

| | | | |
|---|---|---|---|
| 2009/0285175 A1* | 11/2009 | Nix | H04L 65/1094 |
| | | | 370/331 |
| 2010/0040032 A1* | 2/2010 | Jeon | H04W 8/005 |
| | | | 370/338 |
| 2010/0091732 A1* | 4/2010 | Roeder | H04W 36/18 |
| | | | 370/331 |
| 2011/0164598 A1* | 7/2011 | Lee | G06F 1/266 |
| | | | 370/338 |
| 2013/0345884 A1* | 12/2013 | Forbes, Jr. | H02J 13/00034 |
| | | | 700/286 |
| 2015/0066231 A1* | 3/2015 | Clifton | H02J 3/381 |
| | | | 307/46 |
| 2015/0098357 A1* | 4/2015 | Lupien | H04W 84/18 |
| | | | 370/254 |
| 2015/0160187 A1* | 6/2015 | Gofman | G01N 33/49 |
| | | | 436/95 |
| 2018/0034644 A1* | 2/2018 | Komiya | H04L 63/062 |
| 2019/0346417 A1* | 11/2019 | Benefield | G01N 33/0034 |

* cited by examiner

BUILDING WITH WI-FI MESH NETWORK

BACKGROUND

The present invention relates generally to heating, ventilation, and air conditioning (HVAC) systems. More specifically, the present invention relates to building networks for HVAC systems.

In a building, various pieces of building equipment of the HVAC system can communicate via a network within the building. The network may be a wired network, a wireless network, or a combination of both. In some embodiments, to properly operate, the pieces of building equipment must connect to the network in order to communicate data among each other or to other systems or devices connected to the network.

SUMMARY

One implementation of the present disclosure is a building network system for a building, according to some embodiments. The system includes network devices forming a network for the building, according to some embodiments. Each of the network devices include a communications processing circuit including an access point configured to communicate with any of the network devices to form the network, and a second processing circuit removably communicably connected to the communications processing circuit, according to some embodiments. In some embodiments, the communications processing circuit and the second processing circuit are configured to operate independently of each other. In some embodiments, the access point is a wireless radio configured to wirelessly communicate with the access points of any of the network devices.

In some embodiments, at least one of the network devices is a building control device, which includes a communications processing circuit having an access point configured to communicably connect with any of the network devices, a controller processing circuit configured to adjust an operation of building equipment and removably communicably connected to the communications processing circuit. In some embodiments, the access point is a wireless radio configured to wirelessly communicate with the access points of any of the network devices. In some embodiments, the communications processing circuit and the controller processing circuit are configured to operate independently of each other. In some embodiments, the communications processing circuit and the controller processing circuit are configured to communicate with each other. In some embodiments, the communications processing circuit is configured to receive information from the access point regarding the operation of the building equipment and communicate the information regarding the operation of the building equipment to the controller processing circuit.

In some embodiments, at least one of the network devices is a server device, and includes a communications processing circuit having an access point configured to communicably connect with any of the network devices, and a server configured to removably communicably connect with the communications processing circuit. In some embodiments, the communications processing circuit and the server are configured to operate independently of each other. In some embodiments, the access point is a wireless radio configured to wirelessly communicate with the access points of any of the network devices. In some embodiments, the server is configured to receive, from the communications processing circuit through the access point, information regarding the operation of building equipment and is configured to communicate commands to the building control device to control the operation of the building equipment. In some embodiments, the server further includes at least one of Ethernet or USB ports, configured to connect to another network system.

In some embodiments, the server device further includes a cellular dongle configured to connect to a cellular tower. In some embodiments, the cellular dongle is further configured to communicate information between a remote database and the server device.

In some embodiments, the server device is configured to connect to the Internet through the Ethernet port.

In some embodiments, the building network system is a wireless mesh network. In some embodiments, the communications processing circuit of each network device is configured to cause the access point to communicate wirelessly with the network devices to form the wireless mesh network.

Another implementation of the present disclosure is a wirelessly communicable device for a wireless mesh network, including a communications processing circuit configured to cause a wireless radio to wirelessly communicate with a wireless radio of another wirelessly communicable device in the wireless network, a second processing circuit including at least one of a power supply, an environmental controller, and a server, according to some embodiments. In some embodiments, the second processing circuit is configured to operate independently of the communications processing circuit. In some embodiments, the second processing circuit is configured to receive power from a power source.

In some embodiments, the second processing circuit is further configured to supply power to the communications processing circuit through a power interface.

In some embodiments, the communications processing circuit and the second processing circuit are removably communicably connected through a serial interface.

In some embodiments, the communications processing circuit is configured to cause the wireless radio to wirelessly communicate with the wireless radio of another wirelessly communicable device using power supplied through the second processing circuit.

In some embodiments, the server is configured to receive, from the communications processing circuit through the wireless radio, information regarding operation of building equipment and is configured to communicate commands to a building control device to control the operation of the building equipment.

In some embodiments, the server is configured to connect to the Internet through an Ethernet port.

In some embodiments, the server includes at least one of an Ethernet or USB ports configured to connect to another network system.

In some embodiments, the environmental controller is configured to receive information regarding an operation of building equipment from at least one of a wired sensor and a wireless sensor. In some embodiments, the environmental controller is configured to at least one of communicate the information regarding the operation of the building equipment to the communications processor and adjust the operation of the building equipment.

In some embodiments, the environmental controller is configured to receive, from the communications processing circuit, a command to adjust an operation of the building equipment.

In some embodiments, the power supply is configured to receive power from a permanent power source and supply the second processing circuit with power through the power interface.

Another implementation of the present disclosure is a method for establishing a building network system for a building, according to some embodiments. In some embodiments, the method includes receiving, at a communications processing circuit of a first network device, a communication from a second network device via an access point, and transmitting the communication from the communications processing circuit of the first network device to a second processing circuit of the first network device. In some embodiments, the second processing circuit is removably communicably connected to the communications processing circuit and configured to operate independently of the communications processing circuit. In some embodiments, the access point is a wireless radio configured to wirelessly communicate with access points of any of a plurality of network devices. In some embodiments, the second processing circuit is at least one of a power supply, an environmental controller, and a server.

In some embodiments, the method further includes providing power to the second processing circuit from a power source and causing the communications processing circuit of the first network device to communicate with the second network device using the provided power.

In some embodiments, the method further includes receiving, at the second processing circuit, information regarding an operation of building equipment and causing the communications processing circuit of the first network device to communicate the information regarding the operation of the building equipment to the second network device.

In some embodiments, the second processing circuit includes at least one of an Ethernet or a USB port to communicably connect the second processing circuit and the communications processing circuit to another network system.

BRIEF DESCRIPTION OF THE DRAWINGS

Various objects, aspects, features, and advantages of the disclosure will become more apparent and better understood by referring to the detailed description taken in conjunction with the accompanying drawings, in which like reference characters identify corresponding elements throughout. In the drawings, like reference numbers generally indicate identical, functionally similar, and/or structurally similar elements.

DETAILED DESCRIPTION

Building Management System and HVAC System

Figure 1:
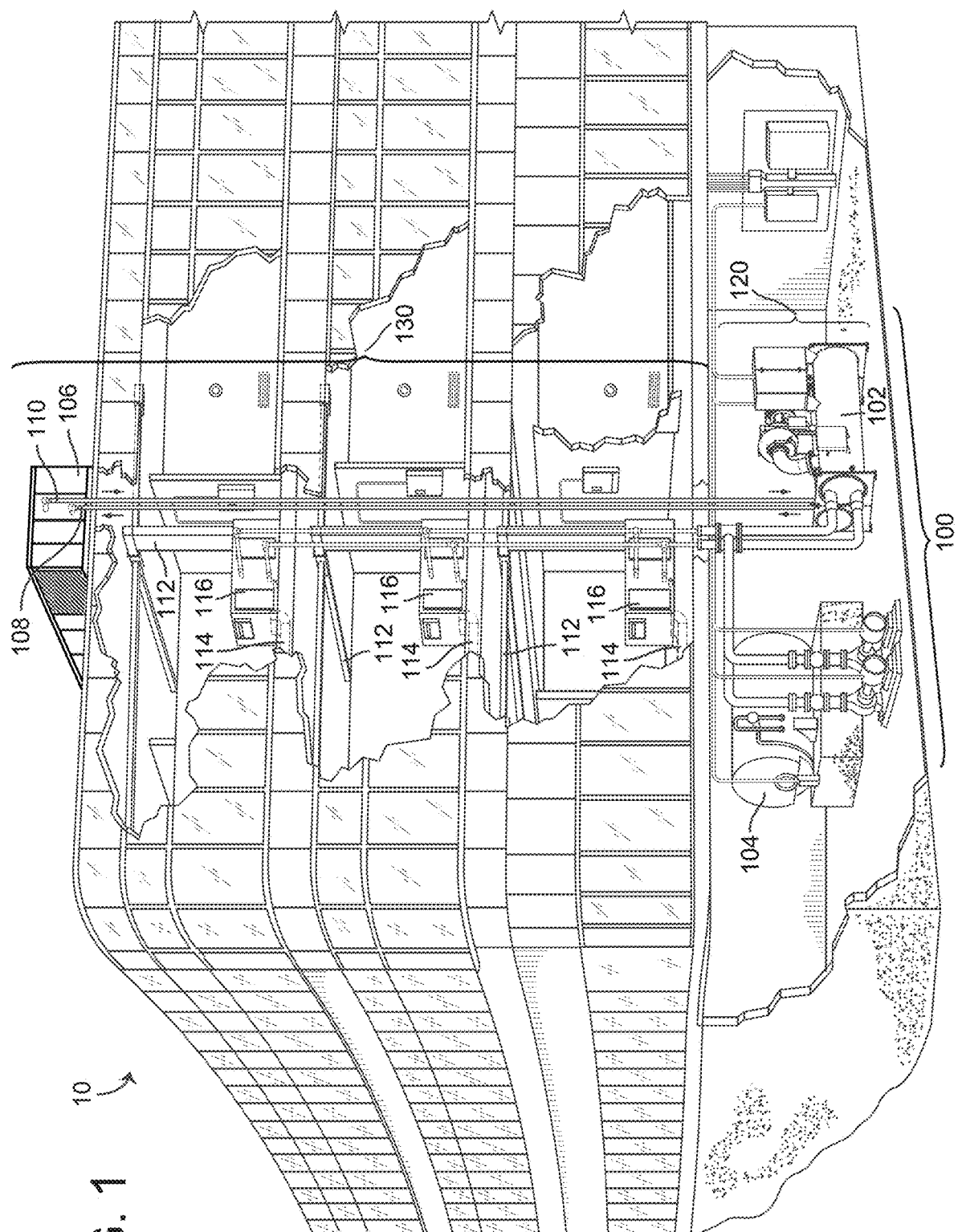
FIG. 1 is a drawing of a building equipped with a HVAC system, according to an exemplary embodiment.
Figure 2:
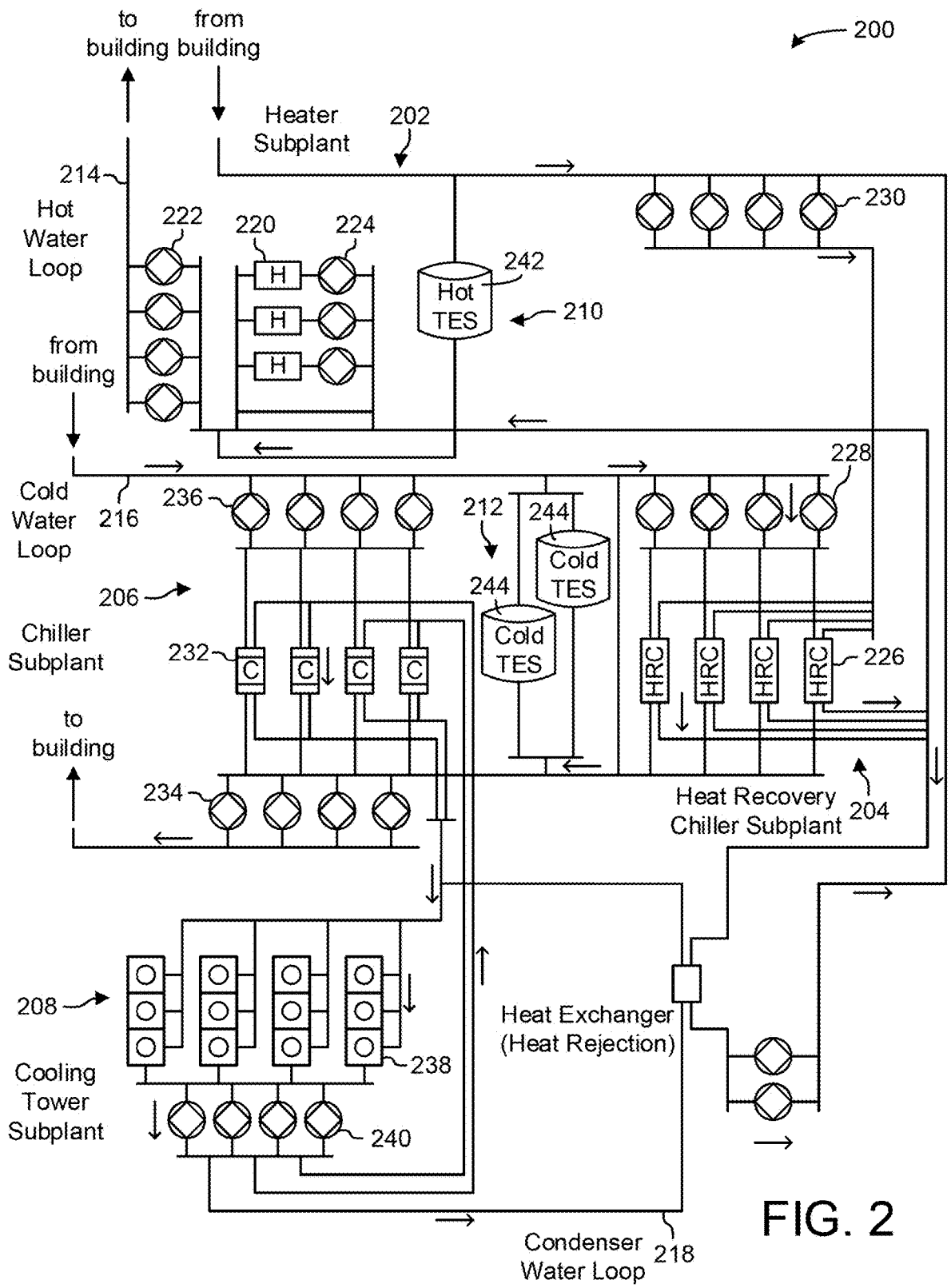
FIG. 2 is a block diagram of a waterside system that may be used in conjunction with the building of FIG. 1, according to an exemplary embodiment.
Figure 3:
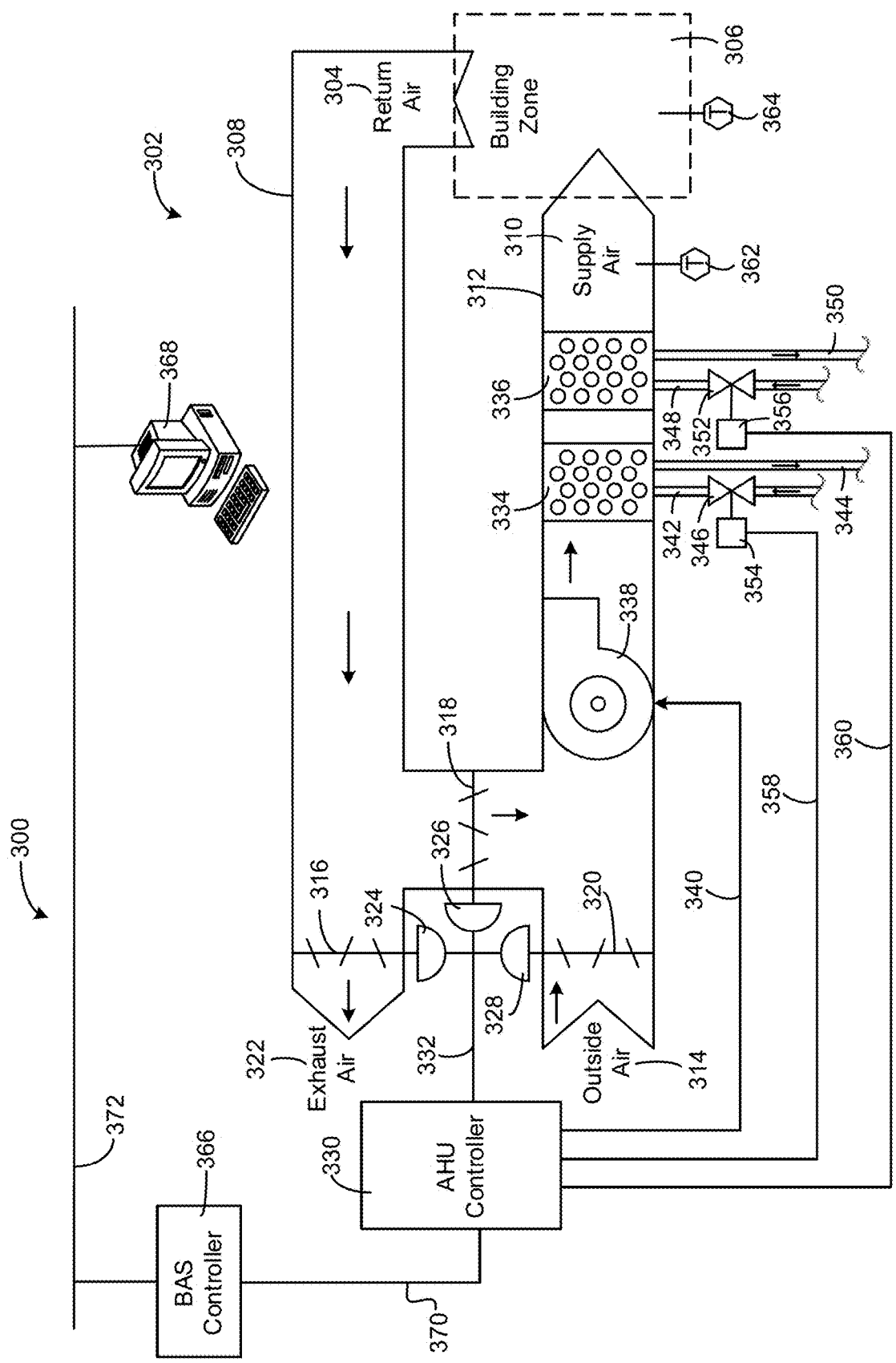
FIG. 3 is a block diagram of an airside system that may be used in conjunction with the building of FIG. 1, according to an exemplary embodiment.

Referring now to FIGS. 1-3, an exemplary building management system (BMS) and HVAC system in which the systems and methods of the present invention can be implemented are shown, according to an exemplary embodiment. Referring particularly to FIG. 1, a perspective view of a building 10 is shown. Building 10 is served by a BMS. A BMS is, in general, a system of devices configured to control, monitor, and manage equipment in or around a building or building area. A BMS can include, for example, a HVAC system, a security system, a lighting system, a fire alerting system, any other system that is capable of managing building functions or devices, or any combination thereof.

The BMS that serves building 10 includes an HVAC system 100. HVAC system 100 can include a plurality of HVAC devices (e.g., heaters, chillers, air handling units, pumps, fans, thermal energy storage, etc.) configured to provide heating, cooling, ventilation, or other services for building 10. For example, HVAC system 100 is shown to include a waterside system 120 and an airside system 130. Waterside system 120 can provide a heated or chilled fluid to an air handling unit of airside system 130. Airside system 130 can use the heated or chilled fluid to heat or cool an airflow provided to building 10. An exemplary waterside system and airside system which can be used in HVAC system 100 are described in greater detail with reference to FIGS. 2-3.

HVAC system 100 is shown to include a chiller 102, a boiler 104, and a rooftop air handling unit (AHU) 106. Waterside system 120 can use boiler 104 and chiller 102 to heat or cool a working fluid (e.g., water, glycol, etc.) and can circulate the working fluid to AHU 106. In various embodiments, the HVAC devices of waterside system 120 can be located in or around building 10 (as shown in FIG. 1) or at an offsite location such as a central plant (e.g., a chiller plant, a steam plant, a heat plant, etc.). The working fluid can be heated in boiler 104 or cooled in chiller 102, depending on whether heating or cooling is required in building 10. Boiler 104 can add heat to the circulated fluid, for example, by burning a combustible material (e.g., natural gas) or using an electric heating element. Chiller 102 can place the circulated fluid in a heat exchange relationship with another fluid (e.g., a refrigerant) in a heat exchanger (e.g., an evaporator) to absorb heat from the circulated fluid. The working fluid from chiller 102 and/or boiler 104 can be transported to AHU 106 via piping 108.

AHU 106 can place the working fluid in a heat exchange relationship with an airflow passing through AHU 106 (e.g., via one or more stages of cooling coils and/or heating coils). The airflow can be, for example, outside air, return air from within building 10, or a combination of both. AHU 106 can transfer heat between the airflow and the working fluid to provide heating or cooling for the airflow. For example, AHU 106 can include one or more fans or blowers configured to pass the airflow over or through a heat exchanger containing the working fluid. The working fluid can then return to chiller 102 or boiler 104 via piping 110.

Airside system 130 can deliver the airflow supplied by AHU 106 (i.e., the supply airflow) to building 10 via air supply ducts 112 and can provide return air from building 10 to AHU 106 via air return ducts 114. In some embodiments, airside system 130 includes multiple variable air volume (VAV) units 116. For example, airside system 130 is shown to include a separate VAV unit 116 on each floor or zone of building 10. VAV units 116 can include dampers or other flow control elements that can be operated to control an amount of the supply airflow provided to individual zones of building 10. In other embodiments, airside system 130 delivers the supply airflow into one or more zones of building 10 (e.g., via supply ducts 112) without using intermediate VAV units 116 or other flow control elements. AHU 106 can include various sensors (e.g., temperature sensors, pressure sensors, etc.) configured to measure attributes of the supply airflow. AHU 106 can receive input from sensors located within AHU 106 and/or within the building zone and can adjust the flow rate, temperature, or other attributes of the supply airflow through AHU 106 to achieve setpoint conditions for the building zone.

Referring now to FIG. 2, a block diagram of a waterside system 200 is shown, according to an exemplary embodiment. In various embodiments, waterside system 200 can supplement or replace waterside system 120 in HVAC system 100 or can be implemented separate from HVAC system 100. When implemented in HVAC system 100, waterside system 200 can include a subset of the HVAC devices in HVAC system 100 (e.g., boiler 104, chiller 102, pumps, valves, etc.) and can operate to supply a heated or chilled fluid to AHU 106. The HVAC devices of waterside system 200 can be located within building 10 (e.g., as components of waterside system 120) or at an offsite location such as a central plant.

In FIG. 2, waterside system 200 is shown as a central plant having a plurality of subplants 202-212. Subplants 202-212 are shown to include a heater subplant 202, a heat recovery chiller subplant 204, a chiller subplant 206, a cooling tower subplant 208, a hot thermal energy storage (TES) subplant 210, and a cold thermal energy storage (TES) subplant 212. Subplants 202-212 consume resources (e.g., water, natural gas, electricity, etc.) from utilities to serve the thermal energy loads (e.g., hot water, cold water, heating, cooling, etc.) of a building or campus. For example, heater subplant 202 can be configured to heat water in a hot water loop 214 that circulates the hot water between heater subplant 202 and building 10. Chiller subplant 206 can be configured to chill water in a cold water loop 216 that circulates the cold water between chiller subplant 206 building 10. Heat recovery chiller subplant 204 can be configured to transfer heat from cold water loop 216 to hot water loop 214 to provide additional heating for the hot water and additional cooling for the cold water. Condenser water loop 218 can absorb heat from the cold water in chiller subplant 206 and reject the absorbed heat in cooling tower subplant 208 or transfer the absorbed heat to hot water loop 214. Hot TES subplant 210 and cold TES subplant 212 can store hot and cold thermal energy, respectively, for subsequent use.

Hot water loop 214 and cold water loop 216 can deliver the heated and/or chilled water to air handlers located on the rooftop of building 10 (e.g., AHU 106) or to individual floors or zones of building 10 (e.g., VAV units 116). The air handlers push air past heat exchangers (e.g., heating coils or cooling coils) through which the water flows to provide heating or cooling for the air. The heated or cooled air can be delivered to individual zones of building 10 to serve the thermal energy loads of building 10. The water then returns to subplants 202-212 to receive further heating or cooling.

Although subplants 202-212 are shown and described as heating and cooling water for circulation to a building, it is understood that any other type of working fluid (e.g., glycol, CO2, etc.) can be used in place of or in addition to water to serve the thermal energy loads. In other embodiments, subplants 202-212 can provide heating and/or cooling directly to the building or campus without requiring an intermediate heat transfer fluid. These and other variations to waterside system 200 are within the teachings of the present invention.

Each of subplants 202-212 can include a variety of equipment configured to facilitate the functions of the subplant. For example, heater subplant 202 is shown to include a plurality of heating elements 220 (e.g., boilers, electric heaters, etc.) configured to add heat to the hot water in hot water loop 214. Heater subplant 202 is also shown to include several pumps 222 and 224 configured to circulate the hot water in hot water loop 214 and to control the flow rate of the hot water through individual heating elements 220. Chiller subplant 206 is shown to include a plurality of chillers 232 configured to remove heat from the cold water in cold water loop 216. Chiller subplant 206 is also shown to include several pumps 234 and 236 configured to circulate the cold water in cold water loop 216 and to control the flow rate of the cold water through individual chillers 232.

Heat recovery chiller subplant 204 is shown to include a plurality of heat recovery heat exchangers 226 (e.g., refrigeration circuits) configured to transfer heat from cold water loop 216 to hot water loop 214. Heat recovery chiller subplant 204 is also shown to include several pumps 228 and 230 configured to circulate the hot water and/or cold water through heat recovery heat exchangers 226 and to control the flow rate of the water through individual heat recovery heat exchangers 226. Cooling tower subplant 208 is shown to include a plurality of cooling towers 238 configured to remove heat from the condenser water in condenser water loop 218. Cooling tower subplant 208 is also shown to include several pumps 240 configured to circulate the condenser water in condenser water loop 218 and to control the flow rate of the condenser water through individual cooling towers 238.

Hot TES subplant 210 is shown to include a hot TES tank 242 configured to store the hot water for later use. Hot TES subplant 210 can also include one or more pumps or valves configured to control the flow rate of the hot water into or out of hot TES tank 242. Cold TES subplant 212 is shown to include cold TES tanks 244 configured to store the cold water for later use. Cold TES subplant 212 can also include one or more pumps or valves configured to control the flow rate of the cold water into or out of cold TES tanks 244.

In some embodiments, one or more of the pumps in waterside system 200 (e.g., pumps 222, 224, 228, 230, 234, 236, and/or 240) or pipelines in waterside system 200 include an isolation valve associated therewith. Isolation valves can be integrated with the pumps or positioned upstream or downstream of the pumps to control the fluid flows in waterside system 200. In various embodiments, waterside system 200 can include more, fewer, or different types of devices and/or subplants based on the particular configuration of waterside system 200 and the types of loads served by waterside system 200.

Referring now to FIG. 3, a block diagram of an airside system 300 is shown, according to an exemplary embodiment. In various embodiments, airside system 300 can supplement or replace airside system 130 in HVAC system 100 or can be implemented separate from HVAC system 100. When implemented in HVAC system 100, airside system 300 can include a subset of the HVAC devices in HVAC system 100 (e.g., AHU 106, VAV units 116, ducts 112-114, fans, dampers, etc.) and can be located in or around building 10. Airside system 300 can operate to heat or cool an airflow provided to building 10 using a heated or chilled fluid provided by waterside system 200.

In FIG. 3, airside system 300 is shown to include an economizer-type air handling unit (AHU) 302. Economizer-type AHUs vary the amount of outside air and return air used by the air handling unit for heating or cooling. For example, AHU 302 can receive return air 304 from building zone 306 via return air duct 308 and can deliver supply air 310 to building zone 306 via supply air duct 312. In some embodiments, AHU 302 is a rooftop unit located on the roof of building 10 (e.g., AHU 106 as shown in FIG. 1) or otherwise positioned to receive both return air 304 and outside air 314. AHU 302 can be configured to operate exhaust air damper 316, mixing damper 318, and outside air damper 320 to control an amount of outside air 314 and return air 304 that combine to form supply air 310. Any return air 304 that does not pass through mixing damper 318 can be exhausted from AHU 302 through exhaust damper 316 as exhaust air 322.

Each of dampers 316-320 can be operated by an actuator. For example, exhaust air damper 316 can be operated by actuator 324, mixing damper 318 can be operated by actuator 326, and outside air damper 320 can be operated by actuator 328. Actuators 324-328 can communicate with an AHU controller 330 via a communications link 332. Actuators 324-328 can receive control signals from AHU controller 330 and can provide feedback signals to AHU controller 330. Feedback signals can include, for example, an indication of a current actuator or damper position, an amount of torque or force exerted by the actuator, diagnostic information (e.g., results of diagnostic tests performed by actuators 324-328), status information, commissioning information, configuration settings, calibration data, and/or other types of information or data that can be collected, stored, or used by actuators 324-328. AHU controller 330 can be an economizer controller configured to use one or more control algorithms (e.g., state-based algorithms, extremum seeking control (ESC) algorithms, proportional-integral (PI) control algorithms, proportional-integral-derivative (PID) control algorithms, model predictive control (MPC) algorithms, feedback control algorithms, etc.) to control actuators 324-328.

Still referring to FIG. 3, AHU 302 is shown to include a cooling coil 334, a heating coil 336, and a fan 338 positioned within supply air duct 312. Fan 338 can be configured to force supply air 310 through cooling coil 334 and/or heating coil 336 and provide supply air 310 to building zone 306. AHU controller 330 can communicate with fan 338 via communications link 340 to control a flow rate of supply air 310. In some embodiments, AHU controller 330 controls an amount of heating or cooling applied to supply air 310 by modulating a speed of fan 338.

Cooling coil 334 can receive a chilled fluid from waterside system 200 (e.g., from cold water loop 216) via piping 342 and can return the chilled fluid to waterside system 200 via piping 344. Valve 346 can be positioned along piping 342 or piping 344 to control a flow rate of the chilled fluid through cooling coil 334. In some embodiments, cooling coil 334 includes multiple stages of cooling coils that can be independently activated and deactivated (e.g., by AHU controller 330, by BMS controller 366, etc.) to modulate an amount of cooling applied to supply air 310.

Heating coil 336 can receive a heated fluid from waterside system 200 (e.g., from hot water loop 214) via piping 348 and can return the heated fluid to waterside system 200 via piping 350. Valve 352 can be positioned along piping 348 or piping 350 to control a flow rate of the heated fluid through heating coil 336. In some embodiments, heating coil 336 includes multiple stages of heating coils that can be independently activated and deactivated (e.g., by AHU controller 330, by BMS controller 366, etc.) to modulate an amount of heating applied to supply air 310.

Each of valves 346 and 352 can be controlled by an actuator. For example, valve 346 can be controlled by actuator 354 and valve 352 can be controlled by actuator 356. Actuators 354-356 can communicate with AHU controller 330 via communications links 358-360. Actuators 354-356 can receive control signals from AHU controller 330 and can provide feedback signals to controller 330. In some embodiments, AHU controller 330 receives a measurement of the supply air temperature from a temperature sensor 362 positioned in supply air duct 312 (e.g., downstream of cooling coil 334 and/or heating coil 336). AHU controller 330 can also receive a measurement of the temperature of building zone 306 from a temperature sensor 364 located in building zone 306.

In some embodiments, AHU controller 330 operates valves 346 and 352 via actuators 354-356 to modulate an amount of heating or cooling provided to supply air 310 (e.g., to achieve a setpoint temperature for supply air 310 or to maintain the temperature of supply air 310 within a setpoint temperature range). The positions of valves 346 and 352 affect the amount of heating or cooling provided to supply air 310 by cooling coil 334 or heating coil 336 and may correlate with the amount of energy consumed to achieve a desired supply air temperature. AHU controller 330 can control the temperature of supply air 310 and/or building zone 306 by activating or deactivating coils 334-336, adjusting a speed of fan 338, or a combination of both.

Still referring to FIG. 3, airside system 300 is shown to include a building management system (BMS) controller 366 and a client device 368. BMS controller 366 can include one or more computer systems (e.g., servers, supervisory controllers, subsystem controllers, etc.) that serve as system level controllers, application or data servers, head nodes, or master controllers for airside system 300, waterside system 200, HVAC system 100, and/or other controllable systems that serve building 10. BMS controller 366 can communicate with multiple downstream building systems or subsystems (e.g., HVAC system 100, a security system, a lighting system, waterside system 200, etc.) via a communications link 370 according to like or disparate protocols (e.g., LON, BACnet, etc.). In various embodiments, AHU controller 330 and BMS controller 366 can be separate (as shown in FIG. 3) or integrated. In an integrated implementation, AHU controller 330 can be a software module configured for execution by a processor of BMS controller 366.

In some embodiments, AHU controller 330 receives information from BMS controller 366 (e.g., commands, setpoints, operating boundaries, etc.) and provides information to BMS controller 366 (e.g., temperature measurements, valve or actuator positions, operating statuses, diagnostics, etc.). For example, AHU controller 330 can provide BMS controller 366 with temperature measurements from temperature sensors 362-364, equipment on/off states, equipment operating capacities, and/or any other information that can be used by BMS controller 366 to monitor or control a variable state or condition within building zone 306.

Client device 368 can include one or more human-machine interfaces or client interfaces (e.g., graphical user interfaces, reporting interfaces, text-based computer interfaces, client-facing web services, web servers that provide pages to web clients, etc.) for controlling, viewing, or otherwise interacting with HVAC system 100, its subsystems, and/or devices. Client device 368 can be a computer workstation, a client terminal, a remote or local interface, or any other type of user interface device. Client device 368 can be a stationary terminal or a mobile device. For example, client device 368 can be a desktop computer, a computer server with a user interface, a laptop computer, a tablet, a smartphone, a PDA, or any other type of mobile or non-mobile device. Client device 368 can communicate with BMS controller 366 and/or AHU controller 330 via communications link 372.

Mesh WiFi Network and Network Boxes

Figure 4:
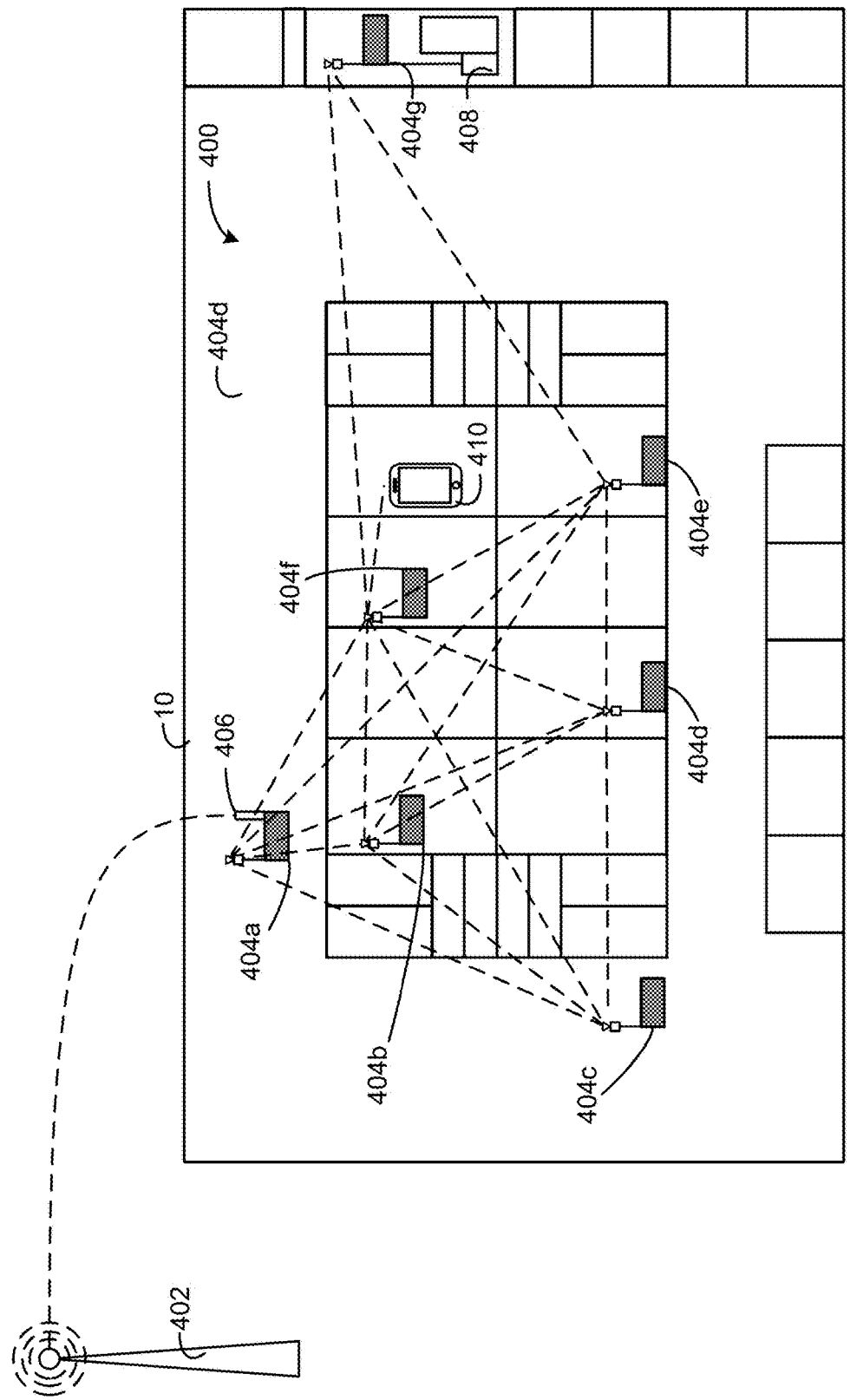
FIG. 4 is a block diagram of a service network in the building of FIG. 1, according to an exemplary embodiment.

Referring now to FIG. 4, a block diagram of a service network 400 is shown, according to an exemplary embodiment. FIG. 4 is shown to include a cell tower 402, network boxes 404a-e, system manager 412, building equipment 408, and user device 410. Network boxes 404a-e and system manager 412 form network 400. Network 400 utilizes IEEE802.11 mesh networking.

As can be seen in FIG. 4, each of the network boxes 404a-g communicate wirelessly through the Wi-Fi mesh with each other providing connection between building equipment 408 and cell tower 402. In FIG. 4, a building 10 is shown. The left side of building 10 may have cellular coverage by cell tower 402, however, the right side of building 10, where building equipment 408 is located, may have poor and/or no connection to cellular tower 402. Network boxes 404a-g may include one network box that communicates with cell tower 402, network box 404a. In some embodiments, network box 404a may operate as a gateway for network boxes 404a-g to communicate with the Internet. In some embodiments, network box 404a may act as a system manager. Network box 404a may have connection to the Internet via cell tower 402. Based on communications between network boxes 404a-g, network boxes 404a-g may all have access to the Internet via network box 404a. Further, building equipment 408 may have connection to the Internet via network box 404g while network box 404g may have connection to the Internet via network box 404a.

Network boxes 404a-g may automatically form a mesh network. For example, an installer may place network box 404a in building 10. Then, the installer may place network box 404b in building 10. Network box 404b can be configured to automatically form a mesh network with network box 404a. Similarly, an installer may place network box 404c in building 10 which is configured to automatically form a mesh network with network box 404b. The same process occurs when an installer places network boxes 404d, 404e, 404f and 404g in building 10.

Network box 404a is shown to include cellular dongle 406. Cellular dongle 406 may be any cellular dongle that is configured to communicate with cellular tower 402. In some embodiments, cellular dongle communicates to cell tower 402 via a 2G network, a 3G network, a LTE network, and/or any other kind of cellular network. Cellular dongle 406 may be a USB device that can be plugged into network box 404a, providing network box 404a with Internet access.

Cellular tower 402 may be any kind of cellular tower that communicates with smartphones and/or cellular dongles e.g., cellular dongle 406. Cellular tower 402 may be a cell tower owned, operated, and/or leased by network service providers such as VERIZON®, AT&T®, SPRINT®, etc. The cellular tower 402 may provide access to a wide area network (WAN) such as the Internet. By connecting to cellular tower, network box 404a can be configured to connect to the Internet and provide network boxes 404b-g access to the Internet.

User device 410 can be any type of user computing device. User device 410 can be a smartphone, a laptop, a technician device, tablet device, and/or any other computing device. Each of network boxes 404a-e may act as a Wi-Fi access point for user device 410. In this regard, user device 410 can connect via Wi-Fi to one of network boxes 404a-e (in FIG. 4 user device 410 is shown to be connected to network box 404d). User device 410 may have Internet connection via the access point since the network box providing user device 410 with the Wi-Fi connection may communicate to cellular tower 402 directly and/or through other network boxes. In FIG. 4, user device 410 is shown to be connected via Wi-Fi to network box 404d. Network box 404d may communicate with network box 404c, network box 404b, and network box 404a to access the Internet and/or another network provided by cellular tower 402.

Building equipment 408 may be any kind of HVAC, security, and/or fire prevention device and/or system. In some embodiments, building equipment 408 is one and/or a combination of AHU 106, VAVs 116, boiler 104, chiller 102, a thermostat, and/or any other building HVAC device. In some embodiments, building equipment 408 is a fire detector, a fire panel, a security camera, a security panel, and/or any other piece of building equipment. Building equipment 408 is shown to be connected to network box 404g. In some embodiments, building equipment 408 is connected to network box 404g via an Ethernet LAN connection. In various embodiments, network box 404g acts as a Wi-Fi access point and building equipment 408 connects to network box 404g via Wi-Fi.

In some embodiments, building equipment 408 can be a fire panel for building 10 that a technician can connect to the Internet via network 400. The technician may be any inspector or other individual who may want to verify the operation of the fire panel. The technician may have a cellular dongle (e.g., cellular dongle 406) that the technician can plug into network box 404a. The technician may move network box 404a to various points in building 10 to achieve a strong connection between cellular tower 402 and network box 404a. In some embodiments, network box 404a may support various network dongles (e.g., various network carriers) so that the technician can utilize various cellular dongles based on the geographic location of building 10 and the coverage offered by each of the network provides in the geographic location of building 10.

The technician may place another network box (e.g., network box 404b) within range of network box 404a. The technician can place another network box closer to the fire panel than network box 404a while still being within range of network box 404a. Network box 404b may automatically connect to network box 404a. The technician can repeat this process of placing network boxes until a path from the fire panel (e.g., building equipment 408) to cellular tower 402 is established. In some embodiments, the last network box, network box 404e may connect to the fire panel via Wi-Fi and/or via an Ethernet cable. In this regard, network boxes may be placed in building 10 until a path is formed that network box 404g can connect to the fire panel via at least one of Wi-Fi and/or Ethernet. In various embodiments, a technician device is connected to the fire panel and this technician device may communicate between the fire panel and the network box 404g. This technician device may be utilized in testing building equipment 408. In some embodiments, the technician device connects to the Internet through network boxes 404a-g.

Figure 5:
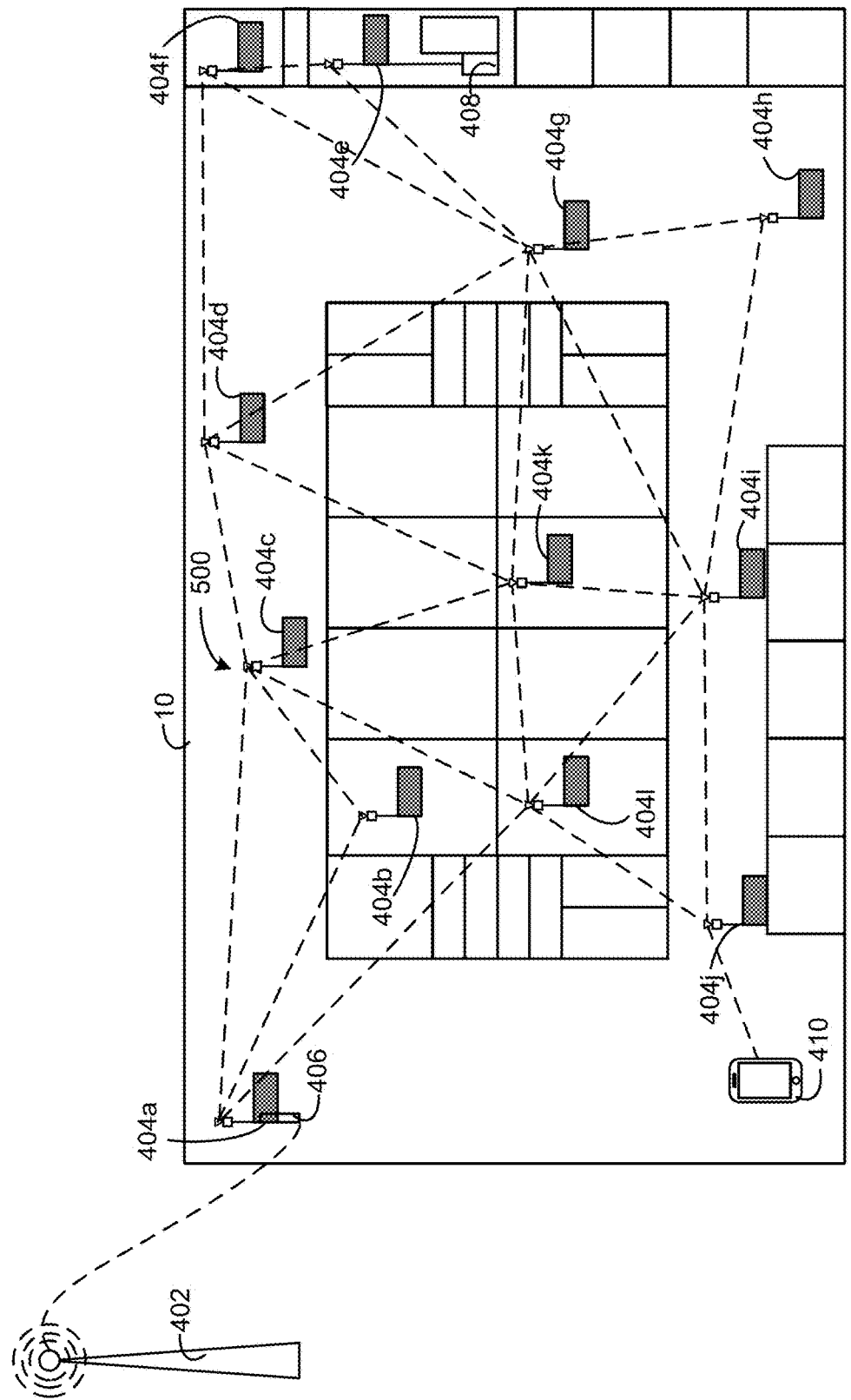
FIG. 5 is a block diagram of a mesh service network in the building of FIG. 1, according to an exemplary embodiment.

Referring now to FIG. 5, network boxes 404a-1 communicating in a mesh in building 10 are shown, according to an exemplary embodiment. Network boxes 404a-1 are shown to communicate in a mesh network 500 in building 10. Every device connected to mesh network 500 may be configured to communicate with every other device connected to mesh network 500, further, each device may be able to communicate to the Internet via mesh network 500. The mesh network utilizes IEEE802.11 mesh networking. Mesh network 500 and network 400 may be the same and/or similar networks. Mesh network 500 may provide a plurality of data packet routes through mesh network 500 between the various devices of mesh network 500. For example, building equipment 408 may have access to cellular tower 402 and/or the Internet via network box 404e, 404g, 404i, 404l, and 404a. However, if this path to cellular tower 402 is unavailable or is not a fast route for transmitting and/or receiving data, network box 404e may communicate via network box 404g, 404k, 404l, 404b, and 404a. There are multiple paths that may be utilized to transmit data to building equipment 408a from cellular tower 402 and/or from building equipment 408 to cellular tower 402.

In some embodiments, each and/or some of network boxes 404a-1 act as wireless access points. In this regard, in FIG. 5, network boxes 404a-1 cover the majority of building 10, adding the availability of a wireless network for mobile phones throughout building 10. For example, user device 410 is shown to communicate with network box 404j. In some embodiments, network boxes 404a-1 may be placed at various locations in building 10 that may have poor cellular connection with cell tower 402. This may allow a technician access to cellular tower 402 via mesh network 500. This may be useful for a technician when the technician is servicing equipment in building 10. In one example, the mesh network 500 may be useful in the case of testing various fire detectors in building 10. A technician inspecting the fire detectors may need Internet connection on the phone of the technician so that the technician can monitor the response of a fire panel to injecting smoke into various smoke detectors. In various embodiments, the technician may place network boxes 404a-1 in building 10 before beginning an inspection and can remove boxes 404a-1 from building 10 and reuse the network boxes in a different building.

Figure 6:
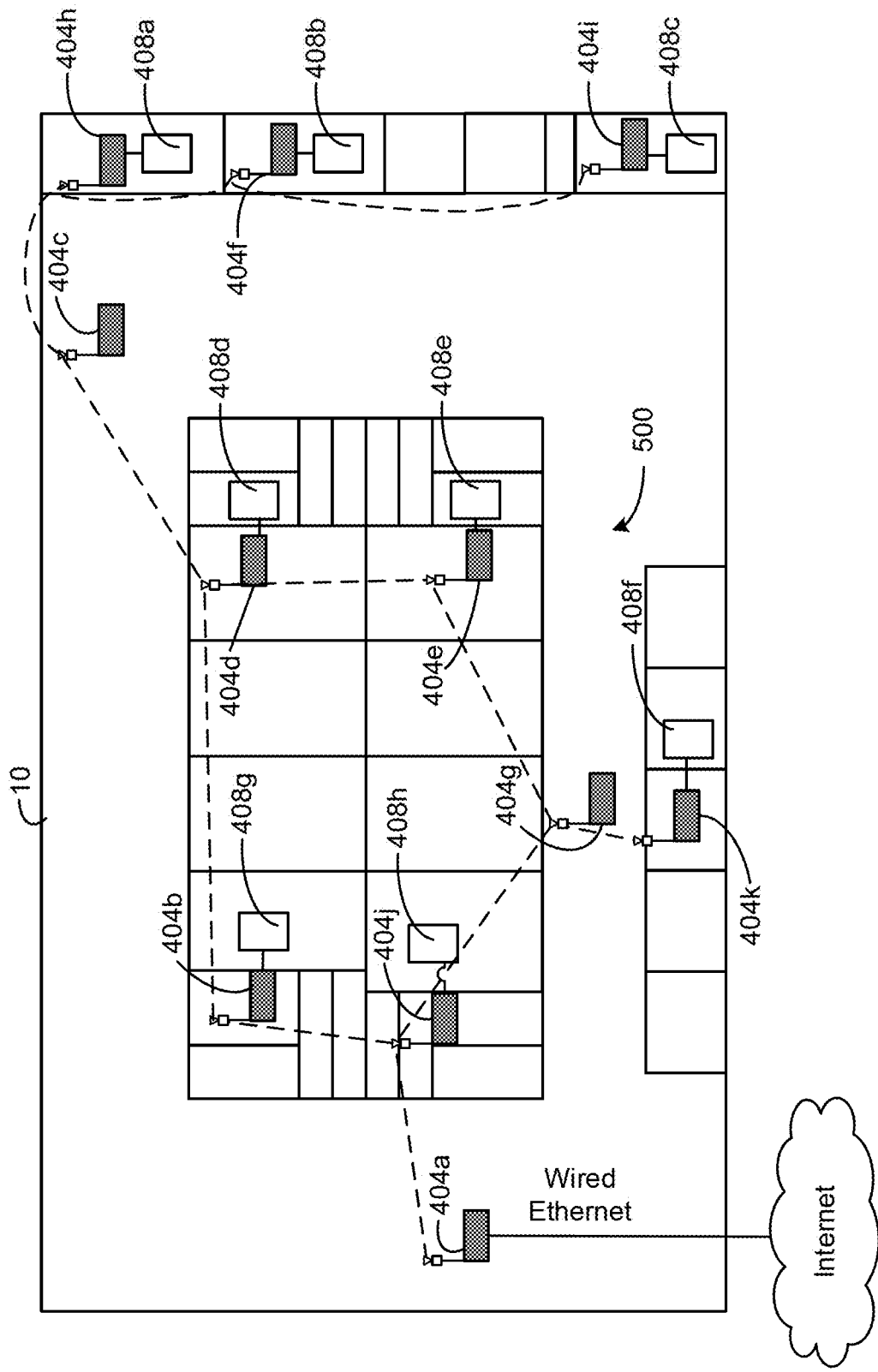
FIG. 6 is a block diagram of a mesh service network in the building of FIG. 1 connecting building equipment together, according to an exemplary embodiment.

Referring now to FIG. 6, a block diagram of a mesh network 500 in building 10 connecting building equipment together is shown, according to an exemplary embodiment. Mesh network 500 is shown to connect building equipment 408a-h. In various embodiments, mesh network 500 may include one network box that has access to the Internet. In various embodiments, there are no building equipment that have access to the Internet. In FIG. 6, network box 404a is shown to be connected to the Internet via a wired Ethernet connection. In this regard, mesh network 500 may be configured to extend an existing Internet connection of building 10 to other areas of building 10.

In FIG. 6, a network box of network boxes 404a-k is connected to each piece of building equipment, building equipment 408a-h. Each network box 404a-k may be connected to a particular building equipment 408a-h via Wi-Fi, a Wi-Fi access point provided by each of the network boxes, or a wired connection to the network boxes 404a-k, such as Ethernet or USB. Each network box may connect the building equipment together allowing them to communicate, may connect the building equipment to the Internet, and may further provide a Wi-Fi access point for a smartphone and/or other Wi-Fi enabled device. In various embodiments, building equipment 408a-k may connect to their respective network boxes via an Ethernet or USB connection. Each of network boxes 404a-k may automatically form mesh network 500. In various embodiments, a technician can deploy any number of network boxes, in some cases, to bridge the any communications gap between network boxes that are too far apart to connect.

Referring now to FIGS. 7-10, the network boxes 404a-404k may also be any one of several devices, as described below. In some embodiments, network boxes 404a-404k may be server devices, environmental controller devices, sensors, access points, power adapters, or other devices which perform different functions yet are communicably linked. Each of these devices may include sub-components which perform different functions, according to some embodiments. Various configurations and numeration of the different devices are possible according to some embodiments. In some embodiments, for example, all of the network boxes 404a-k may be environmental controller devices configured to transmit information between each other via access point devices. In some embodiments, one of the network boxes 404a-k may be a server device, and the other network boxes 404a-k may be a combination of access points, environmental controllers, etc.

Figure 7:
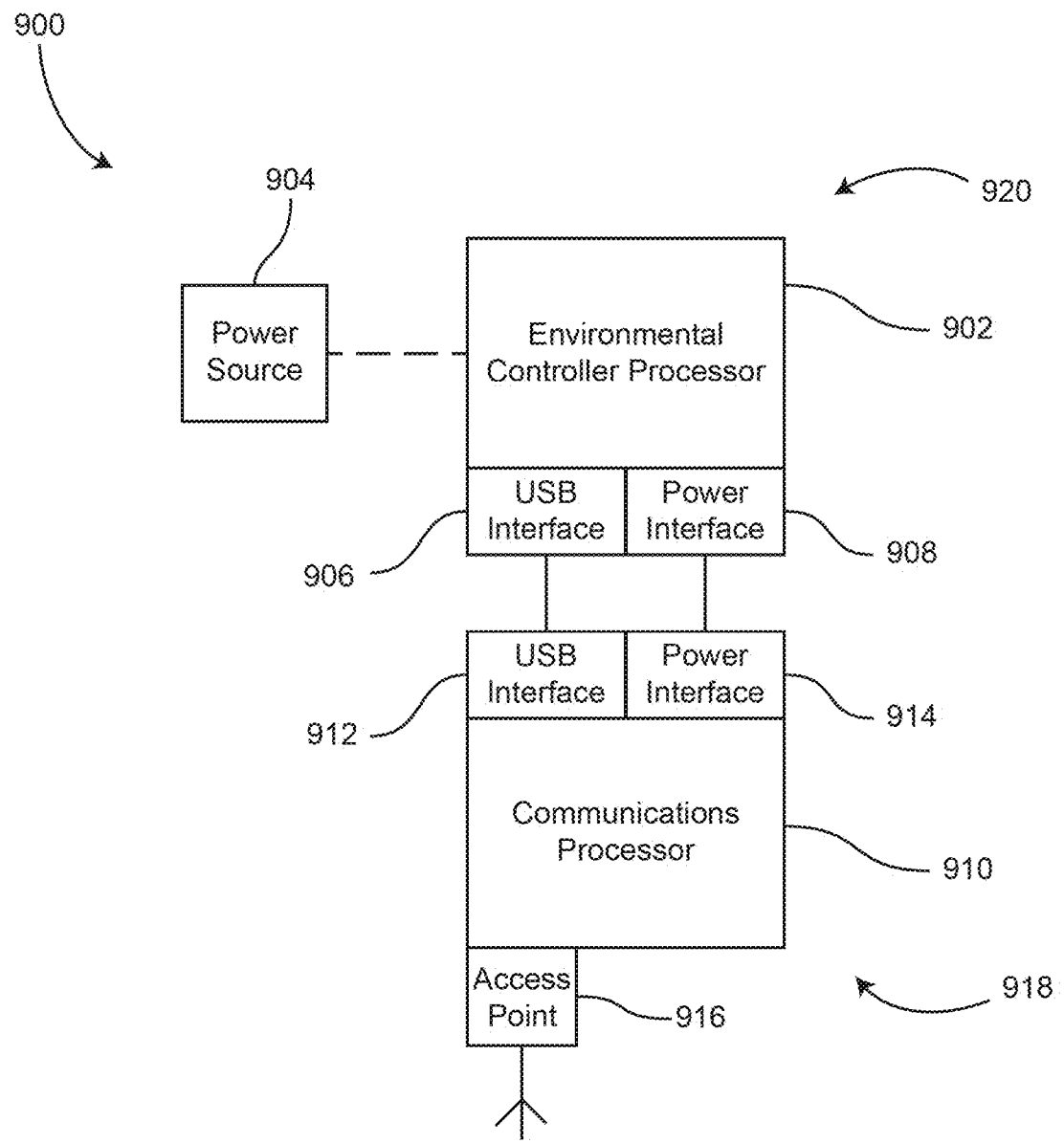
FIG. 7 is a block diagram of a network box of one of the service network of FIGS. 4-6 and 11-12 shown in greater detail, according to an exemplary embodiment.

Referring now to FIG. 7, one of the network boxes 404a-k, is shown as a controller/processor device 900, according to some embodiments. In some embodiments, controller/processor device 900 may have segregated processors which may operate independently of one another. Controller/processor device 900 may include environmental controller 920 and access device 918 according to some embodiments. Environmental controller 920 may include environmental controller processor 902, USB interface 906, and power interface 908 according to some embodiments. In some embodiments, access device 918 may include communications processor 910, USB interface 912, power interface 914, and access point 916.

Environmental controller processor 902 may be configured to process information regarding building equipment 408 and may be configured to operate building equipment 408. In some embodiments, environmental controller processor 902 may control or adjust the operation of thermostats, chillers, air-handling units, fire alarms, etc., or any other building equipment 408. In some embodiments, environmental controller processor 902 is configured to be supplied with power from a power source 904. Power source 904 may be a battery, a wall outlet, or any other electrical power source according to some embodiments. In some embodiments, power source 904 may be a re-chargeable battery, or a one-time use battery. In some embodiments, environmental controller processor 902 is directly wired to power source 904. In some embodiments, communications processor 910 receives power from environmental controller processor 902 through power interface 908 and power interface 914 or USB interface 906 and USB interface 912.

Environmental controller processor 902 and communications processor 910 may both receive power from power source 904 and may also each include a backup power source (e.g., a battery), integrated into the environmental controller processor 902 or communications processor 910 according to some embodiments. In some embodiments, environmental controller processor 902 and communications processor 910 may be configured to draw power from each of their backup power sources if the power source 904 fails. In some embodiments, only environmental controller processor 902 has backup power source, and communications processor 910 may receive power from the backup power source of environmental controller processor 902 through power interfaces 908 and 914 or USB interfaces 906 and 912, if power source 904 fails. In this way, if power source 904 fails, the controller/processor device 900 may continue to operate and control the equipment so that the mesh and the equipment do not cease functioning if power source 904 fails.

According to some embodiments, environmental controller processor 902 is configured to communicate with communications processor 910 through a USB interface 906. USB interface 906 may be configured to communicate with USB interface 912 of communications processor 910. In some embodiments, USB interface 906 and USB interface 912 are any other serial communications interface, such as SPI (serial peripheral interface), I2C (inter-integrated circuit), FireWire, Ethernet, etc. Communications processor 910 may be configured to receive and send information in the mesh network (e.g., mesh network 500) via access point 916 in some embodiments.

In some embodiments, access point 916 may be a radio configured to communicate with the mesh via IEEE802.11 Wi-Fi. Access point 916 may send information regarding the status and operation of the communications processor 910, the environmental controller processor 902, or the building equipment 408 which the environmental controller processor 902 controls. In some embodiments, access point 916 may receive information from the other network boxes 402, regarding the operation and/or status of the communications processor 910 of the other network boxes 402, the environmental controller processor 902 of the other network boxes 402, and the building equipment 408 of the other network boxes 402. In some embodiments, the other network boxes 404 are the same as controller/processor device 900 shown in FIG. 7.

Communications processor 910 may transmit the information received from the access point 916 to the environmental controller processor 902 through USB interface 912 according to some embodiments. Environmental controller processor 902 may receive the information received from the access point 916 of the environmental controller processor 902 through USB interface 906. In some embodiments, environmental controller processor 902 may be configured to process the information received through USB interface 906 and may control and/or adjust the operation of building equipment 408 based on the information received through USB interface 906. In some embodiments, environmental controller processor 902 may transmit information to communications processor 910 through USB interfaces 906 and 912. Communications processor 910 may then transmit the information to the mesh according to some embodiments. In some embodiments, the information is information regarding the operation or status of the building equipment 408 controlled by environmental controller processor 902. For example, communications processor 910 may receive information from the mesh through access point 916 and transmit this information to environmental controller processor 902 through USB interface 912 and USB interface 906, according to some embodiments.

In some embodiments, environmental controller processor 902 may process the information regarding the operation of the other building equipment 408, and determine an adjustment of the operation of the building equipment 408 which environmental controller processor 902 controls. In some embodiments, environmental controller processor 902 may also receive commands from other network boxes 404 (e.g., from a server device), and control the building equipment 408 based on the commands received. For example, if environmental controller processor 902 controls the operation of a thermostat, environmental controller processor 902 may determine that a setpoint of the thermostat should be increased, according to some embodiments. In some embodiments, environmental controller processor 902 may adjust the setpoint of the thermostat, and send information regarding the adjusted thermostat setpoint to the communications processor 910 through the USB interfaces 906 and 912. Communications processor 910 may then transmit the information regarding the adjusted thermostat setpoint to the mesh through access point 916.

In some embodiments, communications processor 910 may receive a command to adjust the operation of the building equipment 408 through access point 916. The command to adjust the operation of the building equipment 408 may be sent from a server device and may be communicated through the mesh to communications processor 910 according to some embodiments. In some embodiments, communications processor 910 may communicate the command to environmental controller processor 902 through USB interface 906 and USB interface 912. Environmental controller processor 902 may then adjust the operation of the building equipment 408 based on the command received from the server. When the operation of the building equipment 408 has been adjusted, environmental controller processor 902 may be configured to transmit information to communications processor 910 that the operation of the building equipment 408 has been adjusted, and communications processor 910 may transmit this information back to the server through access point 916 and the mesh.

In some embodiments, communications processor 910 is powered through power interface 914. Power interface 914 may be connected to power interface 908 and may receive power from power interface 908. In some embodiments, power interface 908 receives power from power source 904 and is configured to supply communications processor 910 with power through power interface 914. In some embodiments, communications processor 910 may receive power through power interface 914 from a power source. The power source may be a battery or an outlet. In some embodiments, the power source of communications processor 910 is separate from power source 904 of environmental controller processor 902. For example, both communications processor 910 and environmental controller processor 902 may receive power through a corded connection to an outlet.

In some embodiments, communications processor 910 and environmental controller processor 902 each cordedly connect to separate outlets. In some embodiments, communications processor 910 and environmental controller processor 902 each include a battery as their power source. In some embodiments, the batteries of communications processor 910 and environmental controller processor 902 may be backup batteries, with the communications processor 910 and environmental controller processor 902 both receiving power input from an outlet, and relying on power from the batteries if the power input from the outlet fails. In some embodiments, communications processor 910 receives power from environmental controller processor 902 through USB interfaces 906 and 912 or power interfaces 908 and 914. In some embodiments, communications processor 910 may only receive power when environmental controller processor 902 receives power from power source 904. In this way, communications processor 910 may only receive power if environmental controller processor 902 receives power. In some embodiments, communications processor 910 relies on environmental controller processor 902 for power but may operate independently from environmental controller processor 902.

In some embodiments, communications processor 910 and environmental controller processor 902 may operate independently from each other. For example, communications processor 910 may receive power from the power source without being connected to environmental controller processor 902, according to some embodiments. In some embodiments, communications processor 910 receives power from power source 904 through environmental controller processor 902, but still operates independently from environmental controller processor 902 (e.g., communications processor 910 may receive and send information to and from the mesh without environmental controller processor 902 controlling building equipment 408). Communications processor 910 may then be configured to communicate with the mesh through access point 916 according to some embodiments. When the communications processor 910 has been configured to communicate with the mesh, the environmental controller processor 902 may then be connected to communications processor 910 so that the building equipment 408 can be controlled according to some embodiments.

In some embodiments, communications processor 910 may require connection to environmental controller processor 902 to be powered, but may operate independently of environmental controller processor 902. For example, communications processor 910 may receive power from the environmental controller processor (through either USB interface 912/906 or power interface 908/914) and may be configured to communicate with the mesh without the environmental controller processor 902 being configured to operate or adjust the operation of building equipment 408. In some embodiments, power may be transferred from the environmental controller processor 902 to the communications processor 910 through either the USB interfaces 906 and 912 or through the power interfaces 908 and 914. In some embodiments, power interfaces 908 and 914 may be a second USB interface and may transmit power from the environmental controller processor 902 to the communications processor 910. In some embodiments, USB interfaces 906 and 912 may transmit information between the environmental controller processor 902 and the communications processor 910 as well as transmitting power between the environmental controller processor 902 and the communications processor 910.

In some embodiments, environmental controller 920 and access device 918 may be contained in separate housings. In some embodiments, environmental controller 920 and access device 918 are contained in separate housings but are connected to each other via wires connected to USB interfaces 906 and 912 and power interfaces 908 and 914. The wired connections between USB interfaces 906 and 912 and power interfaces 908 and 914 may be a selectively removable wired connection according to some embodiments. In some embodiments, environmental controller 920 and access device 918 are contained in the same housing, yet still remain segregated in their operation and function.

In other embodiments, access device 918 may remain the same, while environmental controller 920 may be replaced by other devices, as described in FIGS. 8-10 below. Environmental controller 920 may be replaced by a power adapter, a server, etc., yet the access device 918 may remain structurally the same, and may connect the power adapter, server, or environmental controller 920 to the mesh according to some embodiments.

Figure 8:
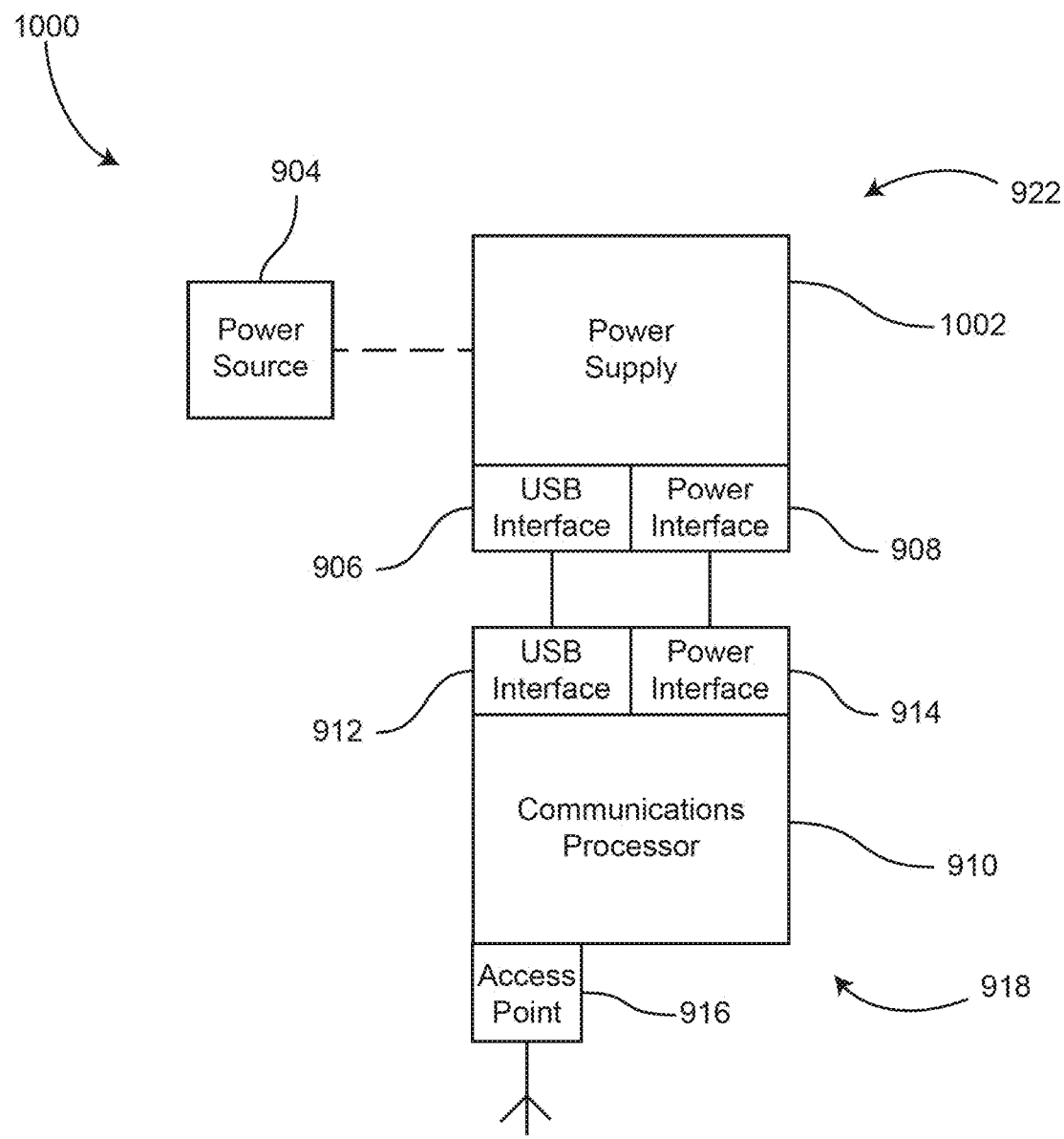
FIG. 8 is a block diagram of a network box of one of the service network of FIGS. 4-6 and 11-12 shown in greater detail, according to an exemplary embodiment.

Referring now to FIG. 8, one of the network boxes 404a-404k is shown as a power adapter/mesh access point device 1000 according to some embodiments. Power adapter/mesh access point device 1000 may act as a device to help widen the area of the mesh without necessarily operating building equipment 408 according to some embodiments (see network box 404g of FIG. 6). In some embodiments, power adapter/mesh access point device 1000 includes power adapter 922 and access device 918.

Power adapter 922 includes power supply 1002 which draws power from power source 904 according to some embodiments. Power adapter 922 may also include USB interface 906, and power interface 908. In some embodiments, power adapter 922 merely supplies access device 918 with power that it receives from power source 904. Power adapter 922 may not necessarily be configured to control the operation of any building equipment 408, according to some embodiments.

In some embodiments, access device 918 includes communications processor 910, access point 916, USB interface 912, and power interface 914. Communications processor 910 may be configured to receive and send information to and from the mesh via access point 916 according to some embodiments. In some embodiments, access device 918 may receive and transmit information from one network box 404 to another network box 404 via access point 916.

Power adapter/mesh access point device 1000 may be placed in the building at a location where the mesh signal strength is low according to some embodiments. In some embodiments, power adapter/mesh access point device 1000 may be placed in or near "dead" zones of the building where the mesh does not reach or where there is no signal strength. In some embodiments, power adapter/mesh access point device 1000 may be used to increase the overall size of the mesh to improve communication between network boxes 404. For example, if there are two network boxes 404 positioned in either end of the building, and both the network boxes 404 are configured to control the operation of building equipment 408 (i.e., the network boxes may each be controller/processor device 900), it may be necessary to provide wireless communication between the two network boxes 404 according to some embodiments.

In some embodiments, wireless communication between the two network boxes 404 may be accomplished by placing other network boxes 404 in between the two network boxes 404. However, if the network boxes 404 in between the two network boxes 404 do not need to control the operation of building equipment 408, network boxes 404 positioned in between the two network boxes 404 may be power adapter/mesh access point devices 1000 according to some embodiments. In this way, power adapter/mesh access point devices 1000 may be used to increase the mesh so that network boxes 404 may communicate with each other, without controlling building equipment 408 itself according to some embodiments.

In some embodiments, controller/processor devices 900 may be used to initially create the mesh and may be configured to communicate wirelessly with each other, without being configured to control building equipment 408. In some embodiments, power adapter/mesh access point devices 1000 may be transitioned into controller/processor device 900. If power adapter 922 and access device 918 are connected via a removable wired connection, power adapter 922 may be disconnected from access device 918 and replaced with environmental controller 920 according to some embodiments. In this way, if power adapter/mesh access point device 1000 is installed at a location in the building where there is no building equipment 408, but building equipment 408 is later installed at this location, power adapter/mesh access point device 1000 may be transitioned into controller/processor device 900 according to some embodiments.

In some embodiments, power adapter/mesh access point device 1000 may be configured to communicate with the mesh before being transitioned into controller/processor device 900. Advantageously, this allows flexibility and allows the mesh to easily adjust to the addition of building equipment 408. Additionally, the power adapter/mesh access point device 1000 may be fully configured to communicate with the mesh before the installation of building equipment 408 and the transition of power adapter/mesh access point device 1000 into controller/processor device 900. For example, network boxes 404 may be installed throughout a building as power adapter/mesh access point devices 1000 before building equipment 408 has been installed. Network boxes 404 may be configured to communicate to form a mesh network (e.g., mesh network 500 or mesh network 400). The building equipment 408 may then be installed at locations near network boxes 404 according to some embodiments. The network boxes 404 near the building equipment 408 may then be transitioned into controller/processor devices 900 by disconnecting the power adapter 922 and connecting environmental controller 920 in place of controller/processor device 900. Environmental controller 920 may then be configured to operate and adjust the operation of the building equipment 408.

Figure 9:
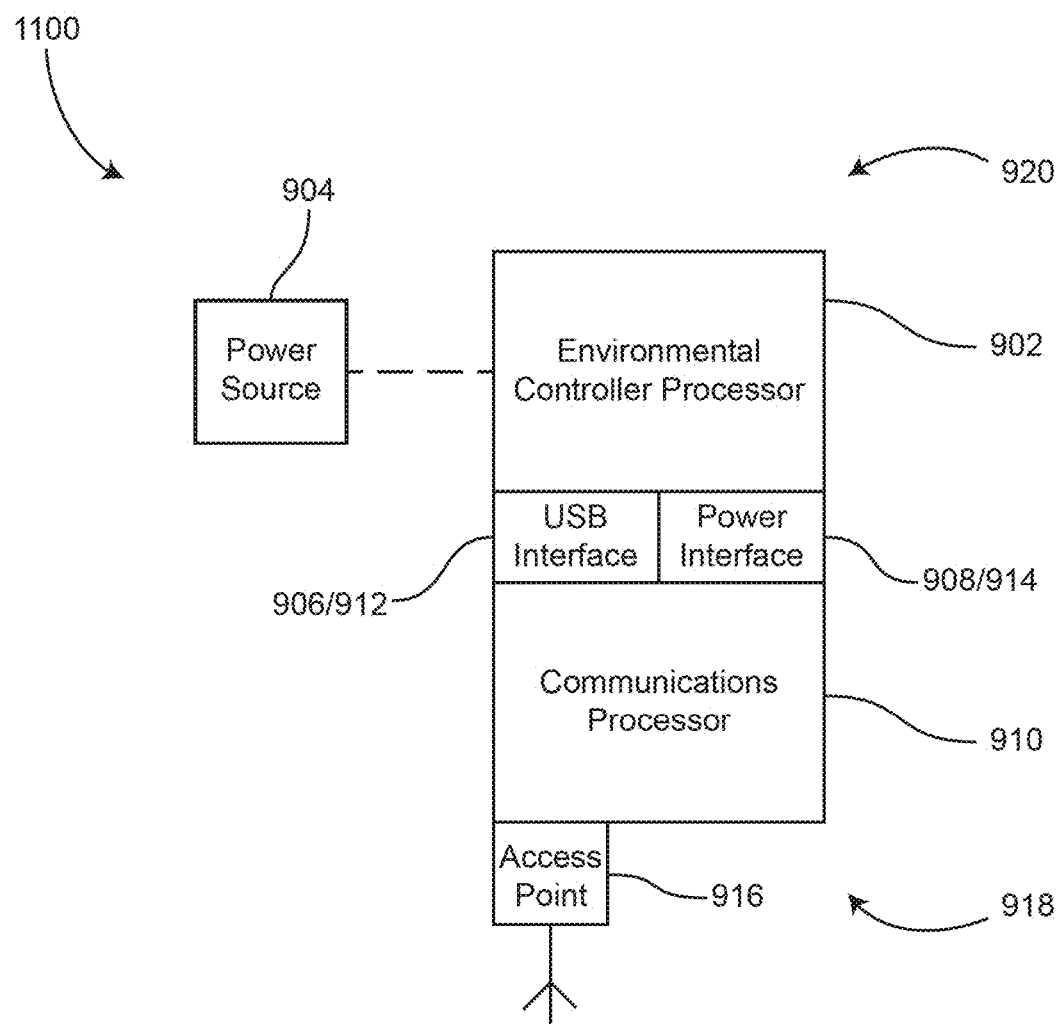
FIG. 9 is a block diagram of a network box of one of the service network of FIGS. 4-6 and 11-12 shown in greater detail, according to an exemplary embodiment.

Referring now to FIG. 9, a controller/processor device 1100 is shown, according to some embodiments. In some embodiments, controller/processor device 1100 is controller/processor device 900 as shown in FIG. 7. Any of the network boxes 404*a*-*k* may be controller/processor device 1100 as shown in FIG. 9, according to some embodiments. As shown in FIG. 9, environmental controller processor 902 and communications processor 910 are co-located, such that USB interface 906/912 and power interface 908/914 are integrally connected according to some embodiments. In some embodiments, controller/processor device 1100 is contained in a single housing and is configured to draw power from power source 904.

While environmental controller processor 902 and communications processor 910 may be contained in a single housing and may be co-located, environmental controller processor 902 and communications processor 910 may still operate independently from each other in their function. For example, environmental controller processor 902 may need to be calibrated and configured before it can control and adjust the operation of building equipment 408 according to some embodiments. In some embodiments, communications processor 910 may also need to be calibrated and configured before it can communicate with the mesh. In some embodiments, the function of communications processor 910 does not rely on the environmental controller processor 902 being calibrated and configured to control building equipment 408. Communications processor 910 may be calibrated and configured to communicate with the mesh and may send and receive information with the mesh without environmental controller processor 902 being configured or calibrated to adjust the operation of building equipment 408 according to some embodiments.

Figure 10:
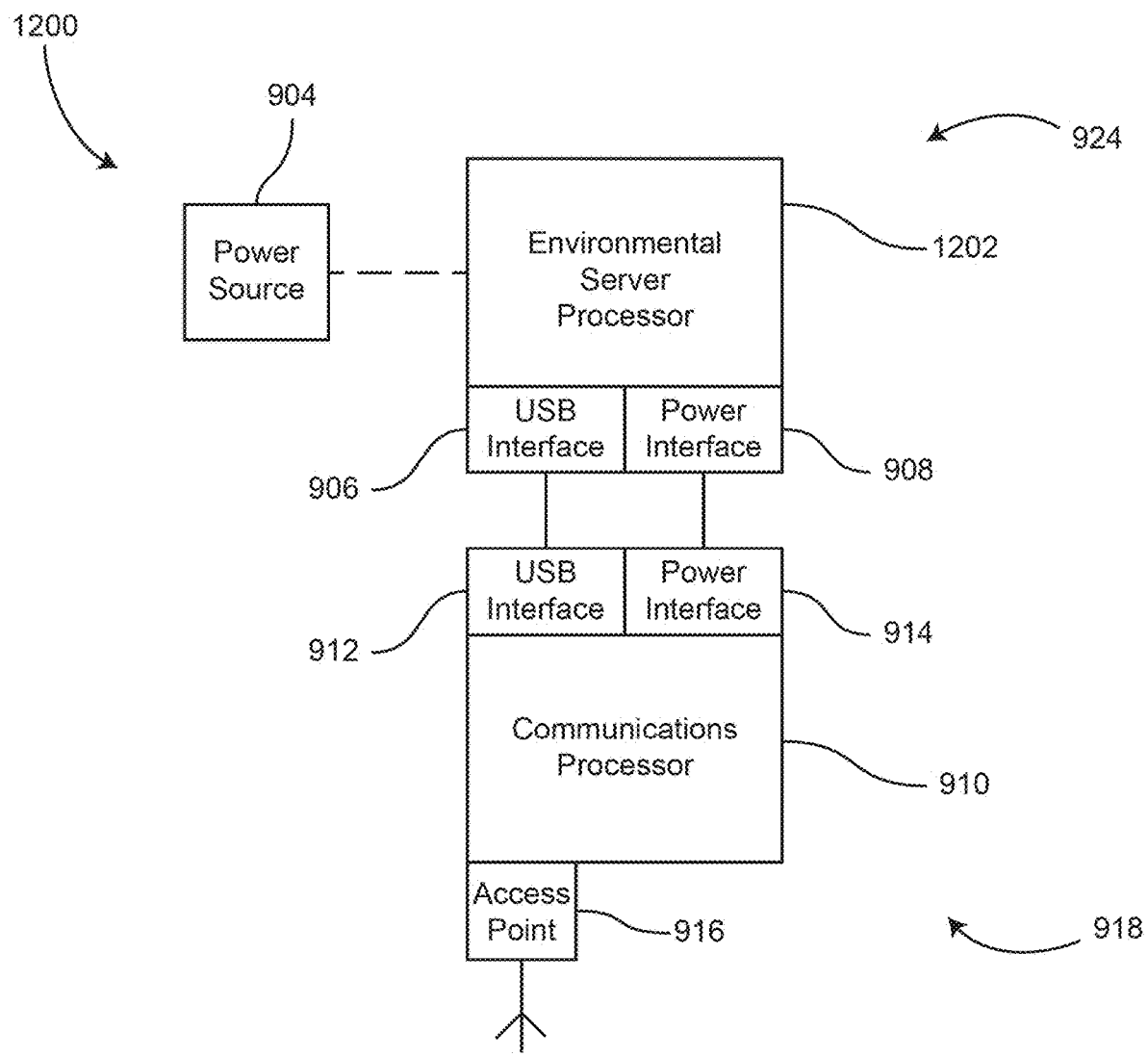
FIG. 10 is a block diagram of a network box of one of the service network of FIGS. 4-6 and 11-12 shown in greater detail, according to an exemplary embodiment.

Referring now to FIG. 10, a server device 1200 is shown, according to some embodiments. In some embodiments, any of the network boxes 404*a*-*k* may be server device 1200. In some embodiments, only one of the network boxes 404*a*-*k* is server device 1200 (e.g., only network box 404*a* is server device 1200). Server device 1200 is shown to include server 924, and access device 918. In some embodiments, server 924 includes environmental server processor 1202, In some embodiments, environmental server 924 includes environmental server processor 1202, USB interface 906, and power interface 908. Server device 1200 may collect and store information regarding each of the network boxes 404 according to some embodiments. For example, in some embodiments, server device 1200 may collect information through the mesh regarding the status and operation of the building equipment 408 which network boxes 404 may be configured to control. Server device 1200 may store this information in a memory of environmental server processor 1202 according to some embodiments.

The memory of environmental server processor 1202 may include one or more devices (e.g., memory units, memory devices, storage devices, etc.) for storing data and/or computer code for completing and/or facilitating the various processes described in the present disclosure. The memory may include random access memory (RAM), read-only memory (ROM), hard drive storage, temporary storage, non-volatile memory, flash memory, optical memory, or any other suitable memory for storing software objects and/or computer instructions. The memory may include database components, object code components, script components, or any other type of information structure for supporting the various activities and information structures described in the present disclosure. The memory may be communicably connected to environmental server processor 1202 and can include computer code for executing (e.g., by environmental server processor 1202) one or more processes.

In some embodiments, the other network boxes 404 are clients of server device 1200. In some embodiments, network boxes 404 may transmit information regarding their status and the operational state of building equipment 408 to the server device continuously. For example, server device 1200 may receive a continuous stream of information from the mesh regarding the live status of network boxes 404 and/or the operational status of building equipment 408. In some embodiments, server device 1200 may broadcast this information to the mesh through access device 918. In some embodiments, server device 1200 may process the information received from the mesh and determine adjustments to the building equipment 408 to be executed by the network boxes 404. In some embodiments, network boxes 404 may receive a command regarding the adjustments to make to building equipment 408 from the server device 1200 through the mesh. In some embodiments, network boxes 404 may communicate with the server device 1200 regarding adjustments to make to the operation of the building equipment 408 and may receive information from neighboring network boxes 404.

Server device 1200 may be configured to operate in a request-serve basis, or a continuous basis. For example, one of the network boxes 404 may send a request to the server device 1200 through the mesh (e.g., a request regarding the operational status of other building equipment 408, or a request of what adjustments to make to the building equipment 408 the network box 404 operates). The server device 1200 may then process the request and transmit the response (e.g., information or a command of how to operate the building equipment 408) to the network box 404 through the mesh. In some embodiments, the network box 404 may receive information from the other network boxes 404 and may send a request to the server device 1200 through the mesh of how to operate the building equipment 408 based on the information received from the other network boxes 404.

In some embodiments, server device 1200 may operate on a continuous basis. For example, there may be a constant exchange of information in the mesh and between the network boxes 404 and the server device 1200. In some embodiments, the server device 1200 continuously receives and transmits information between the server device 1200 and the mesh. In some embodiments, the network boxes 404 continuously transfer information between each other and to and from the server device 1200. In some embodiments, there is a constant exchange of information and/or commands between the network boxes 404 and the server device 1200 according to some embodiments. In this way, the server device 1200 can constantly monitor and collect information regarding the mesh (e.g., building equipment 408 status, building equipment 408 performance, network box status, etc.) according to some embodiments.

In some embodiments, the server device 1200 may continuously provide information and/or commands into the mesh and the network boxes 404 regarding the operation of the building equipment 408. In some embodiments, the information transferred between the server device 1200 and the mesh and network boxes 404 may be stored in memory of the environmental server processor 1202 of server device 1200. In some embodiments, server device 1200 may connect to the Internet via a cellular dongle, and may transmit information to a remote database. In some embodiments, the information transmitted to the remote database may be the information received and transmitted from the mesh and/or network boxes 404 to the server device 1200 and may be stored in the remote database.

In some embodiments, server device 1200 may be accessed via a personal computer device, such as a tablet, a smart phone, a laptop, etc., or any other device that can connect to the Internet. The personal computer device may connect directly to the access point 916 of the server device 1200 and may access the information stored on the memory of server device 1200. In some embodiments, when the personal computer device connects to server device 1200, the personal computer device may access any or all of the information transferred to the server device 1200 from the mesh. In some embodiments, the personal computer device may connect to the server device 1200 by connecting to the mesh via one of the network boxes 404. The personal computer device may require administrative credentials or administrative access to access the information of the server device 1200 according to some embodiments. In some embodiments, the personal computer device may connect to the Internet by connecting to the mesh or to the internet via a cellular dongle of the personal computer device, and may access the information from the server device 1200 on the remote database. In some embodiments, the remote database may be accessed by the personal computer device from a location other than inside the building and may connect to the remote database via any other Internet connection.

Figure 11:
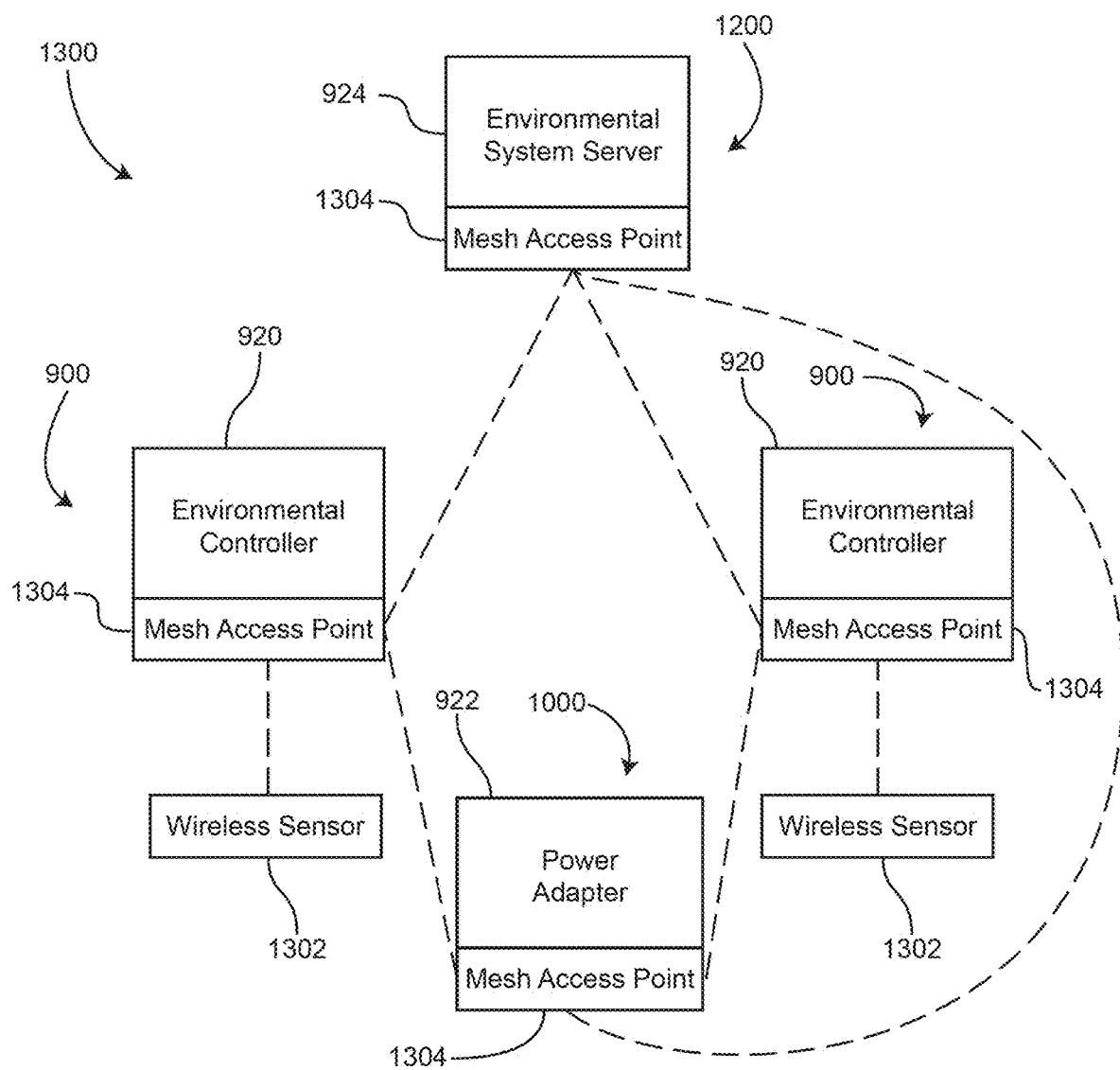
FIG. 11 is a block diagram of a mesh service network in the building of FIG. 1 connecting building equipment together, according to an exemplary embodiment.

Referring now to FIG. 11, a wireless mesh system 1300 is shown, according to some embodiments. Wireless mesh system 1300 may include server device 1200, controller/processor devices 900, and power adapter/mesh access point device 1000, according to some embodiments. In some embodiments, wireless mesh system 1300 may be configured to operate independently of other network infrastructures (e.g., other building infrastructures which are not directly related to building equipment 408).

Wireless mesh system 1300 is also shown to include wireless sensors 1302 according to some embodiments. In some embodiments, wireless sensors 1302 may be configured to wirelessly transmit information to mesh access points 1304. Mesh access points 1304 may be access device 918 according to some embodiments, and may include communications processor 910 and access point 916. Wireless sensors 1302 may transmit information regarding the operation or status of building equipment 408, or any other information of the building which may be used to make decisions regarding the operation of the building equipment 408 (e.g., temperature, humidity, smoke detection, occupancy, etc.) to mesh access points 1304 according to some embodiments. In some embodiments, wireless sensors 1302 may transmit information to the mesh access points 1304 using Wi-Fi, Bluetooth, Zigbee, LoRa, and/or any other wireless transmission method. In some embodiments, wireless sensors 1302 may be directly wired to mesh access points 1304 via USB, Firewire, SPI (serial peripheral interface), I2C (inter-integrated circuit), Ethernet, etc., or any other serial communication.

Wireless mesh system 1300 is also shown to include power adapter/mesh access point device 1000 according to some embodiments. FIG. 11 shows only one power adapter/mesh access point device 1000, however any number of power adapter/mesh access point devices 1000 may be used according to some embodiments. In some embodiments, power adapter/mesh access point device 1000 does not directly control the operation of building equipment 408, but may make the mesh larger and provide additional coverage to locations which may require mesh access but do not necessarily have building equipment 408 that needs to be controlled. In some embodiments, power adapter/mesh access point device 1000 may increase the size of wireless mesh system 1300 in order to provide additional area and footprint of wireless mesh system 1300.

Wireless mesh system 1300 is also shown to include controller/processor devices 900 according to some embodiments. FIG. 11 shows only two controller/processor devices 900, however any number of controller/processor devices 900 may be used according to some embodiments. In some embodiments, controller/processor device 900 may control the operation of building equipment 408. In some embodiments, controller/processor device 900 is configured to receive information from wireless sensor 1302 through mesh access point 1304. In some embodiments, mesh access point 1304 is access device 918 and communicates with the wireless mesh system 1300 or wireless sensor 1302 via access point 916. In some embodiments, controller/processor device 900 is directly wired to wireless sensor 1302.

Wireless sensor 1302 may send information to mesh access point 1304 regarding the operation or status of building equipment 408 according to some embodiments. In some embodiments, wireless sensor 1302 may be a sensor installed on building equipment 408, while in some embodiments, wireless sensor 1302 may be integrally formed with the building equipment 408. In some embodiments, wireless sensor 1302 may be part of a control system of the building equipment 408. Wireless sensor 1302 may also monitor and send information regarding the building to mesh access point 1304. For example, wireless sensor 1302 may be a thermometer, a smoke detector, a light detector, a security camera, a humidity detector, etc. In some embodiments, wireless sensor 1302 may also be a controller. In some embodiments, wireless sensor 1302 is a controller and is directly wired to controller/processor device 900. Wireless sensor 1302 may be a controller configured to adjust the operation of the building equipment 408 according to some embodiments.

In some embodiments, controller/processor device 900 includes environmental controller 920. Environmental controller 920 may be configured to control and/or adjust the operation of building equipment 408 in some embodiments. In some embodiments, environmental controller 920 may include a processing circuit configured to interpret the information received through mesh access point 1304 from the wireless mesh system 1300 and to adjust the operation of the building equipment 408 based on the information received from the wireless mesh system 1300. In some embodiments, environmental controller 920 includes environmental controller processor 902, USB interface 906, and power interface 908, as shown in FIG. 7.

Referring still to FIG. 11, wireless mesh system 1300 is shown to include server device 1200, according to some embodiments. Server device 1200 may include environmental system server 924 according to some embodiments. In some embodiments, server device 1200 may perform all of the functions as described in reference to FIG. 10. Server device 1200 may include environmental server processor 1202, USB interface 906, and power interface 908 according to some embodiments. Environmental server processor 1202 may be configured to receive information from the wireless mesh system 1300 and determine the operation of the building equipment 408 based on the information received from the wireless mesh system 1300 using various building management algorithms according to some embodiments.

Figure 12:
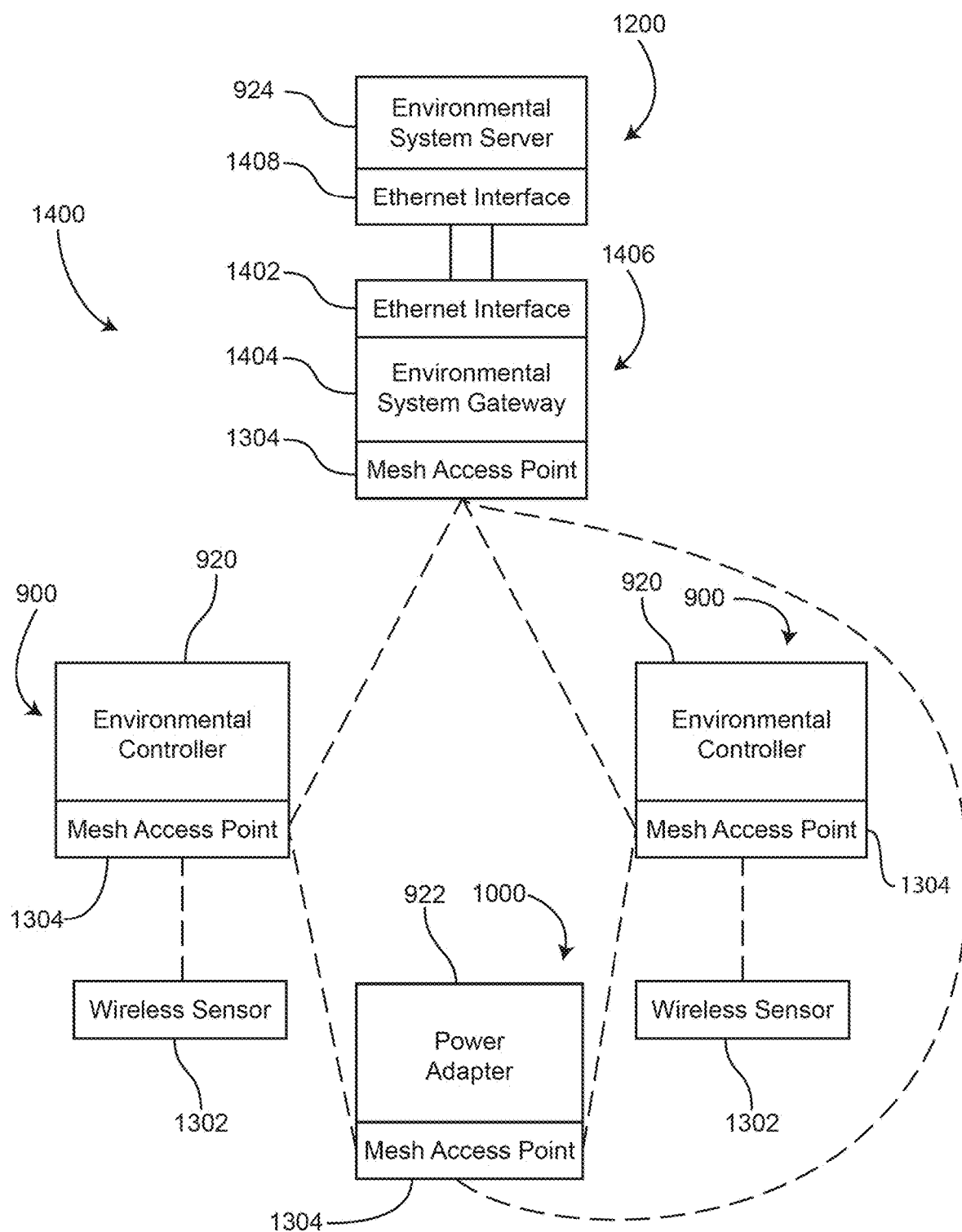
FIG. 12 is a block diagram of a mesh service network in the building of FIG. 1 connecting building equipment together, according to an exemplary embodiment.

Referring now to FIG. 12, wireless mesh system 1400 is shown according to some embodiments. Wireless mesh system 1400 may include server device 1200, gateway server device 1406, controller/processor devices 900, and power adapter/mesh access point device 1000. In some embodiments, controller/processor devices 900 may be positioned a distance farther away than they are able to communicate, resulting in a communication gap. Power adapter/mesh access point device 1000 may bridge the communication gap by being placed in between the controller/processor devices 900, within range of each of controller/processor devices 900. Power adapter/mesh access point device 1000 may serve to enable the controller/processor devices 900 to communicate by providing a communication path between controller/processor devices 900.

As shown in FIG. 12, wireless mesh system 1400 is also shown to include gateway server device 1406, according to some embodiments. Gateway server device 1406 may include mesh access point 1304, environmental system gateway 1404, and Ethernet interface 1402 according to some embodiments. In some embodiments, mesh access point 1304 is access device 918. In some embodiments, mesh access point 1304 is access device 918 and includes communications processor 910 and access point 916. Gateway server device 1406 may communicate with the wireless mesh system 1400 and may receive or send information from/to wireless mesh system 1400.

In some embodiments, environmental system gateway 1404 receives information from wireless mesh system 1400 and processes or filters the information. Environmental system gateway 1404 may serve as a gateway to environmental system server 924 according to some embodiments. In some embodiments, environmental system gateway 1404 processes the information from wireless mesh system 1400 received through mesh access point 1304 and sends the information to environmental system server 924. In some embodiments, environmental system gateway 1404 may categorize the information received from wireless mesh system 1400 and send the categorized information to environmental system server 924 through Ethernet interface 1402 and Ethernet interface 1408 of server device 1200. Environmental system server 924 of server device 1200 may receive the information from environmental system gateway 1404 through Ethernet interface 1408, and may store the information in a database. In some embodiments, environmental system server 924 may store the information in memory, as described above. In some embodiments, environmental system server 924 may transmit the information to a remote database to be stored.

Environmental system server 924 may also control the operation of the building equipment 408 (see FIG. 6) controlled by environmental controllers 920 according to some embodiments. In some embodiments, environmental system server 924 may send commands to the wireless mesh system 1400 which determine how the building equipment 408 should be controlled by environmental controllers 920. In order to control the operation of the building equipment 408 by sending commands to the environmental controllers 920, the server device 1200 does not necessarily have to be in direct communication with each controller/processor device 900. For example, each controller/processor device 900 may have a unique address according to some embodiments. When the controller/processor device 900 sends information to the wireless mesh system 1400 indicating the operation of the building equipment 408 which the controller/processor device 900 controls, it may include the unique address of the controller/processor device 900 so that the server device 1200 knows the controller/processor device 900 and the building equipment 408 to which the information pertains.

In some embodiments, server device 1200 may send commands to the controller/processor devices 900 through the wireless mesh network 1400. For example, in some embodiments, server device 1200 may send a command to particular controller/processor device 900 to increase a thermostat which the particular controller/processor device 900 controls by 1° F. In some embodiments, the command includes the address of the particular controller/processor device 900. If a different controller/processor device 900 with a different address receives the command from the server device 1200 (i.e., the server device 1200 may not be in direct communication with the particular controller/processor device 900 which controls the thermostat to be adjusted), the different controller/processor device 900 may send the information to the particular controller/processor device 900 with the correct address according to some embodiments. In this way, the server device 1200 does not need to be in direct communication with controller/processor devices 900 and may send an address with a command so that the command is transferred among the controller/processor devices 900 and/or power adapter/mesh access point device 1000 until it reaches the controller/processor device 900 with the correct address.

Wireless mesh system 1400 may also include wireless sensors 1302 configured to read information and send the information to mesh access points 1304 according to some embodiments. In some embodiments, wireless sensors 1302 read information regarding the status and/or operation of building equipment 408. In some embodiments, wireless sensors 1302 read information regarding the properties of the building (e.g., temperature, humidity, etc.). Wireless sensors 1302 may transmit information to the mesh access points 1304 using IEEE 802.11 Wi-Fi. In some embodiments, wireless sensors 1302 may be directly wired to mesh access points 1304 via USB, Firewire, SPI (serial peripheral interface), I2C (inter-integrated circuit), Ethernet, etc., or any other serial communication.

Figure 13:
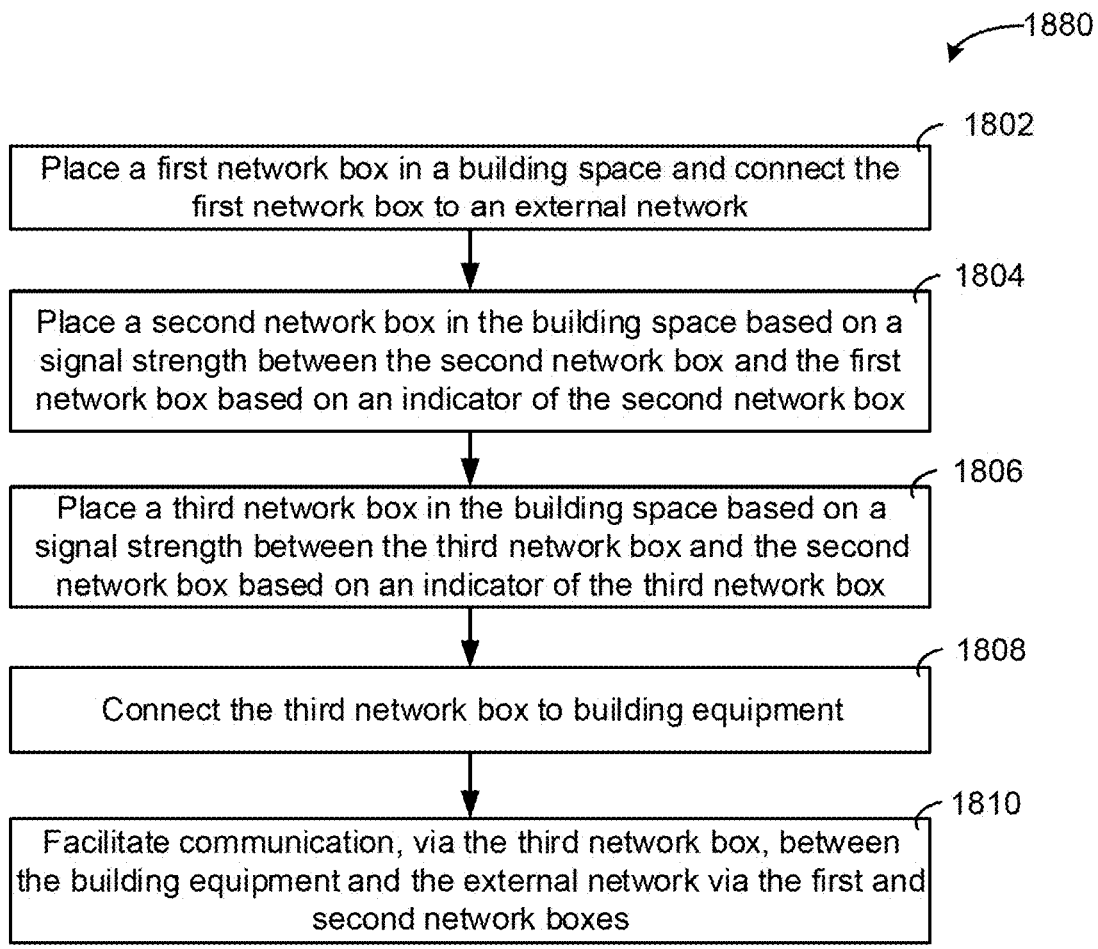
FIG. 13 is a flow diagram of a process for providing a piece of building equipment connectivity to an external network via one or more of the network boxes of FIG. 7, according to an exemplary embodiment.

Referring now to FIG. 13, a flow diagram of process 1800 is shown for placing network boxes in a building to connect building equipment 408 to an external network (e.g., the Internet). In step 1802, a technician may place a first network box in a building space and connect the network box to the Internet. In some embodiments, the technician may connect the network box to the Internet via cellular dongle 406 and/or Ethernet port 712. Connecting the network box to the Internet may cause the network box to act as a gateway to the Internet for other network boxes.

In step 1804, the technician may place a second network box in the building space based on a signal strength. In step 1806, a technician may place a third network box based on a signal strength between the third network box and the second network box. Step 1806 can be repeated by a technician as many times as necessary, adding as many network boxes as needed, to reach the building equipment 408. Each successive network box may be placed between the previously-placed network box and the building equipment 408 to extend the network closer to the building equipment 408. Network boxes may be placed based on an indication of signal strength between network boxes as indicated by an indicator on the network boxes.

Although three network boxes are used in this example, it is contemplated that any number of network boxes can be placed or installed to reach the building equipment 408. In some embodiments, only one network box may be required (e.g., the first network box is within range of the building equipment 408). In other embodiments, two network boxes may be sufficient to reach the building equipment 408. In other embodiments, three or more network boxes may be installed to reach the building equipment 408. Each network box may connect to the previous network box installed and/or any other network boxes within range.

In step 1808, the last box installed, in this case the third box, is connected to the building equipment 408. In step 1810, the third box can facilitate communication between the third box and the second box, the second box and the first box, and the first box and the Internet. Based on the chain of network boxes, the building equipment 408 can be connected to the Internet. In some embodiments, the first network box, the second network box, and the third network box for a mesh network, wherein various paths for forwarding data packets can be formed. In various embodiments, the network formed by the network boxes is start network typology, a bus network typology, a ring network topology, etc.

Additionally, the network infrastructure is wireless, which enables the building equipment to wirelessly transmit information to a server, reducing the possibility of incorrect cable connections and reducing the need to install and re-install cables throughout the building. The present invention may also be used as a temporary wireless network, which may be used for testing the building equipment during the building construction phase. The temporary wireless network may then be integrated into the permanent building network, which may reduce costs associated with removing the temporary network and installing a new permanent network.

Configuration of Exemplary Embodiments

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements may be reversed or otherwise varied and the nature or number of discrete elements or positions may be altered or varied. Accordingly, all such modifications are intended to be included within the scope of the present disclosure. The order or sequence of any process or method steps may be varied or re-sequenced according to alternative embodiments. Other substitutions, modifications, changes, and omissions may be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general purpose computer, special purpose computer, or special purpose processing machines to perform a certain function or group of functions.

Although the figures show a specific order of method steps, the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed is:

1. A building network system for a building, the system comprising:
   a plurality of network devices forming a network for the building, wherein each of the plurality of network devices comprise:
      a communications processing circuit comprising an access point configured to communicate with any of the plurality of network devices to form the network; and
      a second processing circuit removably communicably connected to the communications processing circuit;
   wherein the communications processing circuit is configured to communicate with one or more of the plurality of network devices without requiring power input from the second processing circuit and without requiring data input from the second processing circuit;
   wherein the access point is a wireless radio configured to wirelessly communicate with access points of any of the plurality of network devices.

2. The building network system of claim 1, wherein at least one of the plurality of network devices is a building control device, wherein the building control device comprises:
   a communications processing circuit comprising an access point configured to communicably connect with any of the plurality of network devices;
   a controller processing circuit configured to adjust an operation of building equipment and removably communicably connected to the communications processing circuit;
   wherein the access point is a wireless radio configured to wirelessly communicate with the access points of any of the plurality of network devices;
   wherein the communications processing circuit and the controller processing circuit are configured to operate independently of each other;
   wherein the communications processing circuit and the controller processing circuit are configured to communicate with each other; and
   wherein the communications processing circuit is configured to receive information from the access point regarding the operation of the building equipment and communicate the information regarding the operation of the building equipment to the controller processing circuit.

3. The building network system of claim 2, wherein at least one of the plurality of network devices is a server device, wherein the server device comprises:
   a communications processing circuit comprising an access point configured to communicably connect with any of the plurality of network devices;
   a server configured to removably communicably connect with the communications processing circuit;
   wherein the communications processing circuit and the server are configured to operate independently of each other;
   wherein the access point is a wireless radio configured to wirelessly communicate with the access points of any of the plurality of network devices;
   wherein the server is configured to receive, from the communications processing circuit through the access point, information regarding the operation of building equipment and is configured to communicate commands to the building control device to control the operation of the building equipment;
   wherein the server further comprises at least one of Ethernet or USB ports, configured to connect to another network system.

4. The building network system of claim 3, wherein the server device further comprises a cellular dongle configured to connect to a cellular tower, wherein the cellular dongle is further configured to communicate information between a remote database and the server device.

5. The building network system of claim 3, wherein the server device is configured to connect to the Internet through the Ethernet port.

6. The building network system of claim 1, wherein the building network system is a wireless mesh network, wherein the communications processing circuit of each network device is configured to cause the access point to communicate wirelessly with the plurality of network devices to form the wireless mesh network.

7. A wirelessly communicable device for a wireless mesh network, the wirelessly communicable device comprising:
   a communications processing circuit configured to cause a wireless radio to wirelessly communicate with a wireless radio of another wirelessly communicable device in the wireless network; and
   a second processing circuit comprising at least one of a power supply, an environmental controller, and a server, and wherein the communications processing circuit is configured to communicate with the other wirelessly communicable device in the wireless network without requiring power input from the second processing circuit and without requiring data input from the second processing circuit.

8. The device of claim 7, wherein the second processing circuit is further configured to supply power to the communications processing circuit through a power interface.

9. The device of claim 8, wherein the communications processing circuit and the second processing circuit are removably communicably connected through a serial interface.

10. The device of claim 9, wherein the communications processing circuit is configured to cause the wireless radio to wirelessly communicate with the wireless radio of another wirelessly communicable device using power supplied through the second processing circuit.

11. The device of claim 9, wherein the environmental controller is configured to receive information regarding an operation of building equipment from at least one of a wired sensor and a wireless sensor, and wherein the environmental controller is configured to at least one of communicate the information regarding the operation of the building equipment to the communications processing circuit and adjust the operation of the building equipment.

12. The device of claim 11, wherein the environmental controller is configured to receive, from the communications processing circuit, a command to adjust an operation of the building equipment.

13. The device of claim 9, wherein the power supply is configured to receive power from a permanent power source and supply the second processing circuit with power through the power interface.

14. The device of claim 7, wherein the server is configured to receive, from the communications processing circuit through the wireless radio, information regarding operation of building equipment and is configured to communicate commands to a building control device to control the operation of the building equipment.

15. The device of claim 14, wherein the server is configured to connect to the Internet through an Ethernet port.

16. The device of claim 14, wherein the server comprises at least one of an Ethernet or USB ports configured to connect to another network system.

17. A method for establishing a building network system for a building, the method comprising:

receiving, at a communications processing circuit of a first network device, a communication from a second network device via an access point; and transmitting the communication from the communications processing circuit of the first network device to a second processing circuit of the first network device, wherein the communications processing circuit is removably communicably connected to the second processing circuit and is configured to communicate with the second network device without requiring power input from the second processing circuit of the first network device and without requiring data input from the second processing circuit of the first network device;

wherein the access point is a wireless radio configured to wirelessly communicate with access points of any of a plurality of network devices; and wherein the second processing circuit is at least one of a power supply, an environmental controller, and a server.

18. The method of claim 17, further comprising providing power to the second processing circuit from a power source and causing the communications processing circuit of the first network device to communicate with the second network device using the provided power.

19. The method of claim 17, further comprising receiving, at the second processing circuit, information regarding an operation of building equipment and causing the communications processing circuit of the first network device to communicate the information regarding the operation of the building equipment to the second network device.

20. The method of claim 17, wherein the second processing circuit comprises at least one of an Ethernet or a USB port to communicably connect the second processing circuit and the communications processing circuit to another network system.

\* \* \* \* \*